(12) United States Patent
Chen et al.

(10) Patent No.: US 11,837,973 B2
(45) Date of Patent: Dec. 5, 2023

(54) DIFFERENTIAL COMPLIANT DISPLACEMENT REDUCER

(71) Applicant: XI'AN JIAOTONG UNIVERSITY, Shaanxi (CN)

(72) Inventors: Guimin Chen, Shaanxi (CN); Houqi Wu, Shaanxi (CN); Lingling Li, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 22 days.

(21) Appl. No.: 17/573,489

(22) Filed: Jan. 11, 2022

(65) Prior Publication Data
US 2022/0224254 A1 Jul. 14, 2022

(51) Int. Cl.
*H02N 2/04* (2006.01)
(52) U.S. Cl.
CPC ..................... *H02N 2/04* (2013.01)
(58) Field of Classification Search
CPC ................. H02N 2/04; H02N 2/043
See application file for complete search history.

(56) References Cited

U.S. PATENT DOCUMENTS 8,937,424 B2 * 1/2015 Griffin .................. H02N 2/043
310/328

* cited by examiner

Primary Examiner — Emily P Pham

(57) ABSTRACT

The invention discloses a differential compliant displacement reducer, and relates to three technical solutions with similar working principles. The three technical solutions have the following characteristics: firstly, the three technical solutions all relate to an outer frame and all belong to a differential compliant displacement reducer circumferentially formed by extending upward and downward along both ends of the driver, and the working principle is similar; secondly, the differential motion of the three technical solutions comes from the difference caused by deformation of the upper and lower or inclined upper and lower deformable parts of the driver in the differential compliant displacement reducer; thirdly, compared with a traditional displacement amplifier, the three technical solutions all belong to the displacement reducer, the structure is simpler than that of the existing displacement amplifier; and fourthly, the three technical solutions can be matched with a macro-motion platform.

20 Claims, 20 Drawing Sheets

DIFFERENTIAL COMPLIANT DISPLACEMENT REDUCER

CROSS-REFERENCE TO RELATED APPLICATIONS

The application requires the rights and interests of the priority of the Chinese patent application which is submitted to the China National Intellectual Property Administration on Jan. 11, 2021 and has the application number of 202110033935X, the Chinese patent application which is submitted to the China National Intellectual Property Administration on Jan. 11, 2021 and has the application number of 2021100339345, and the Chinese patent application which is submitted to the China National Intellectual Property Administration on Jul. 27, 2021 and has the application number of 2021108516988.

TECHNICAL FIELD

The invention belongs to the field of precision driving and transmission, and particularly relates to a differential compliant displacement reducer.

BACKGROUND

The nanometer positioning technology is the basis for realizing nanometer control and nanometer measurement. A piezoelectric stack driver is generally adopted to directly drive and position, or a displacement amplifier (such as a bridge type or a lever type) is utilized to further amplify the displacement on the basis of the piezoelectric stack driver, and the positioning mode generally can only reach the motion precision of dozens of nanometers or even hundreds of nanometers.

Along with the development of science and technology, the fields of semiconductor technology, spaceflight science and technology, optical and optoelectronic engineering, bioengineering and the like have higher and higher requirements on positioning precision. However, an existing positioning mode and a displacement mechanism thereof need to be further improved so as to meet high motion precision.

SUMMARY

The differential compliant displacement reducer is relatively simple in structure and better in dynamic performance, and the problem that an existing positioning mode is low in positioning precision is solved.

In order to realize the purpose, the invention discloses the following technical solution:

the differential compliant displacement reducer, including:
two compliant branch chain modules, two rigid connecting blocks (3) correspondingly connected with the two compliant branch chain modules, a fixing block (4), an output block (5) and a driver (6) arranged between the two rigid connecting blocks (3);
each compliant branch chain module includes a corresponding outer compliant branch chain module (1) and a corresponding inner compliant branch chain module (2), wherein,
one end of the outer compliant branch chain module (1) and one end of the inner compliant branch chain module (2) are respectively connected to one end of the rigid connecting block (3);
the other end of the outer compliant branch chain module (1) is connected to the fixed block (4);
the other end of the inner compliant branch chain module (2) is connected to the output block (5); and the fixing block (4) and the output block (5) jointly form an outer frame, all the outer compliant branch chain modules (1), all the inner compliant branch chain modules (2), all the rigid connecting blocks (3) and the driver (6) are sealed in the outer frame to form a compact overall structure, and in addition, from the outside to the inside of the outer frame, the outer side of the outer compliant branch chain module (1), the inner side of the outer compliant branch chain module (1), the outer side of the inner compliant branch chain module (2) and the inner side of the inner compliant branch chain module (2) are sequentially arranged.

Preferably,
the outer compliant branch chain module (1) and the inner compliant branch chain module (2) have the same deformation motion direction.

Preferably,
the driver (6) provides linear input to enable the two rigid connecting blocks (3) to move away from or close to each other.

Preferably,
the outer compliant branch chain module (1) includes one or more parallel branch chains, the inner compliant branch chain module (2) includes one or more parallel branch chains, and the outer compliant branch chain module (1) and the inner compliant branch chain module (2) are concentrated flexibility type branch chain modules or distributed flexibility type branch chain modules.

Preferably,
the concentrated flexibility type branch chain module is a rigid block with compliant hinges at the two ends; and the distributed flexibility type branch chain module is a whole section of compliant beam.

Preferably,
the outer compliant branch chain module (1) and the inner compliant branch chain module (2) are arranged in the same direction.

Preferably,
the fixed block (4) is of a ⌊_⌋-shaped half-frame structure, and the output block (5) is located in a gap of the half-frame structure.

Preferably,
notches are symmetrically formed in the two sides of the two ends of each concentrated flexibility type branch chain module, and compliant hinges are formed on the inner sides of the notches.

In addition, the invention also discloses a differential compliant displacement reducer, including:
two fixed half-bridge compliant modules (1A), two movable half-bridge compliant modules (2A), two rigid connecting blocks (3A), a middle block (5A), an output block (7A) and a driver (4A) between the two rigid connecting blocks (3A);
along the circumferential direction of the displacement reducer, a movable outer frame is formed by the first fixed half-bridge compliant module (1A), the first rigid connecting block (3A), the first movable half-bridge compliant module (2A), the output block (7A), the second movable half-bridge compliant module (2A), the second rigid connecting block (3A), the second fixed half-bridge compliant module (1A) and the middle block (5A);

for the fixed half-bridge compliant module (1A) and the movable half-bridge compliant module (2A) which are connected with the rigid connecting block, wherein, one end of the fixed half-bridge compliant module (1A) and one end of the movable half-bridge compliant module (2A) are connected to the two ends of the rigid connecting block (3A) respectively;

the other end of the fixed half-bridge compliant module (1A) is connected to the middle block (5A); and the other end of the movable half-bridge compliant module (2A) is connected to the output block (7A).

Preferably, a compliant branch chain (6A) is a concentrated flexibility type branch chain or a distributed flexibility type branch chain.

Preferably, notches are symmetrically formed in the two sides of the two ends of each concentrated flexibility type branch chain, and compliant hinges are formed on the inner sides of the notches.

Preferably, the distributed flexibility type branch chain is a whole section of compliant beam, and the compliant beam is a long beam or a reed.

Preferably, the fixed half-bridge compliant module (1A) and the movable half-bridge compliant module (2A) are arranged in the same direction.

Preferably, a middle block of the fixed half-bridge compliant module (1A) is connected with a rack, and a middle block of the movable half-bridge compliant module (2A) is an output end.

Preferably, the two ends of the driver (4A) are fixedly connected with the two rigid connecting blocks, and the driver (4A) provides linear input to enable the two rigid connecting blocks to move away from or close to each other.

In addition, the invention further discloses a differential compliant displacement reducer, including:

a forward motion module (1B), a reverse motion module (2B), two total input sections (3B), a total output section (4B) and a driver (5B);

one end of the forward motion module (1B) is connected with one end of the first total input section (3B), and the other end of the forward motion module (1B) is connected with one end of the second total input section (3B);

one end of the reverse motion module (2B) is connected with the other end of the first total input section (3B), and the other end of the reverse motion module (2B) is connected with the other end of the second total input section (3B);

the driver (5B) is arranged between the first total input section (3B) and the second total input section (3B); and the driver (5B) simultaneously provides displacement input for the forward motion module (1B) and the reverse motion module (2B).

Preferably, the forward motion module (1B) and the reverse motion module (2B) are combined in a manner that a bridge type module is combined with a Scott-Russell composite module, the Scott-Russell composite module is combined with the bridge type module, or the Scott-Russell composite module is combined with the Scott-Russell composite module.

Preferably, the bridge type module includes a branch connecting block (6B) and bridge type branches (7B), and one or more bridge type branches (7B) are distributed and connected to the two sides of the branch connecting block (6B).

Preferably, the bridge type branch (7B) is a concentrated flexibility type branch or a distributed flexibility type branch;

notches are symmetrically formed in the two sides of the two ends of the concentrated flexibility type branch, and compliant hinges are formed on the inner sides of the notches; and the distributed flexibility type branch is a whole section of compliant beam, and the compliant beam is a long beam or a reed.

Preferably, when the forward motion module (1B) is a Scott-Russell composite module, a Scott-Russell upper connecting block (10B) of the forward motion module (1B) is fixed; when the forward motion module (1B) is a bridge type module, the branch connecting block (6B) of the forward motion module (1B) is fixed; and when the reverse motion module (2B) is a Scott-Russell composite module, a Scott-Russell upper connecting block (10B) of the reverse motion module (2B) is a total output section (4B); and when the reverse motion module (2B) is a bridge type module, the branch connecting block (6B) of the reverse motion module is a total output section (4B).

Compared with the prior art, the invention has the following technical effects: differential superposition of displacement is achieved through the components on the two sides of the driver, large-scale reduction of the input displacement of the driver is achieved, the large displacement reduction ratio is obtained, and therefore the resolution ratio and precision of motion are greatly improved.

The invention discloses three technical solutions of the differential compliant displacement reducer, and provides three types of differential compliant displacement reducers which are different in specific form and have the following common characteristics:

firstly, the three technical solutions all relate to an outer frame and all belong to a differential compliant displacement reducer circumferentially formed by extending upward and downward along both ends of the driver, and the working principle is similar;

secondly, the differential motion of the three technical solutions comes from the difference caused by deformation of the upper and lower or inclined upper and lower deformable parts of the driver in the differential compliant displacement reducer; thirdly, compared with a traditional displacement amplifier, the three technical solutions all belong to the displacement reducer, the structure is simpler than that of the existing displacement amplifier, the body structure can be integrally machined, the structure is simple, and assembly is not needed; and fourthly, the three technical solutions can be matched with a macro-motion platform, so that large-range and ultrahigh-precision motion positioning is realized; compared with the prior art, the precision can be improved by at least one order of magnitude, for example, the precision is improved to 2 nanometers or even higher.

DETAILED DESCRIPTION

The invention is further described by various embodiments according to the following drawings.

Figure 1:
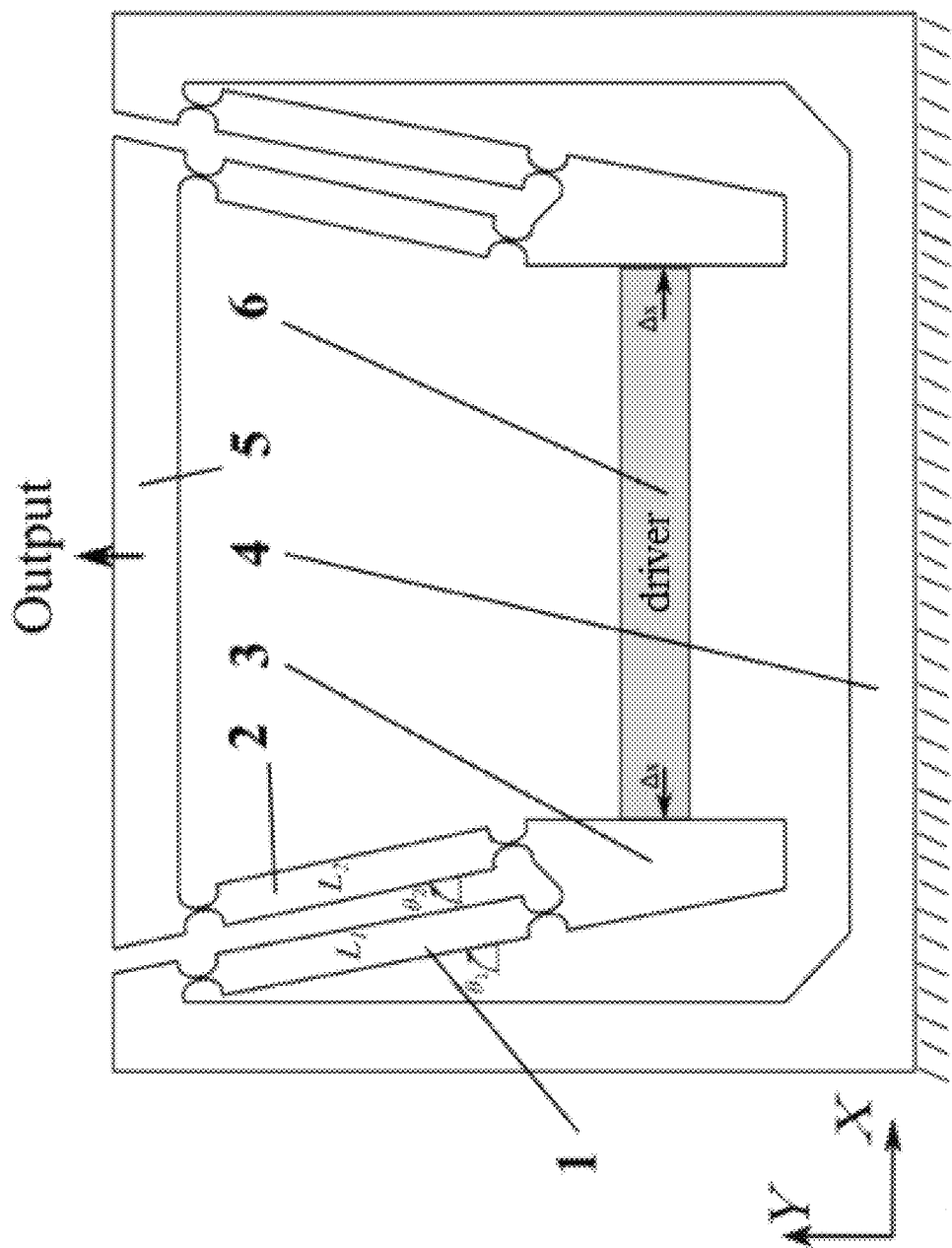
FIG. 1 is a schematic diagram of a concentrated flexibility type structure in one embodiment of the invention.

In the first part, the following is the first technical solution disclosed by the invention: please refer to FIG. 1 to FIG. 5, taking FIG. 1 as an example, in one embodiment, the invention discloses a differential compliant displacement reducer which includes outer compliant branch chain modules 1, inner compliant branch chain modules 2, rigid connecting blocks 3, a fixing block 4, an output block 5 and a driver 6. The driver is arranged between the two rigid connecting blocks; one ends of the two outer compliant branch chain modules are respectively connected to the rigid connecting blocks, and the other ends of the two outer compliant branch chain modules are respectively connected to the fixed block; one ends of the two inner compliant branch chain modules are connected to the two rigid connecting blocks respectively, and the other ends of the two inner compliant branch chain modules are connected to the output block respectively.

It can be understood that the two compliant branches are arranged in the same direction to produce a differential motion.

In another embodiment, each of the outer compliant branch chain module and the inner compliant branch chain module can include one or more parallel branch chains, and the outer compliant branch chain module and the inner compliant branch chain module are of a concentrated flexibility type or a distributed flexibility type.

In another embodiment, the concentrated compliant branch chain module is formed by a section of rigid block and compliant hinges at the two ends; the distributed flexibility type branch chain module is a whole section of compliant beam.

In another embodiment, the fixing block is fixedly connected with the rack, and the two ends of the fixing block are connected with the outer compliant branch chains.

In another embodiment, the two ends of a piezoelectric driver are fixed to the rigid connecting blocks, and transverse displacement is input to the rigid connecting blocks.

Furthermore, the two ends of the rigid connecting block are connected with the outer compliant branch chain module and the inner compliant branch chain module respectively.

In another embodiment, the two ends of the output block serving as the output end are connected with the inner compliant branch chain modules, and the reduced displacement is output outwards.

Figure 2:
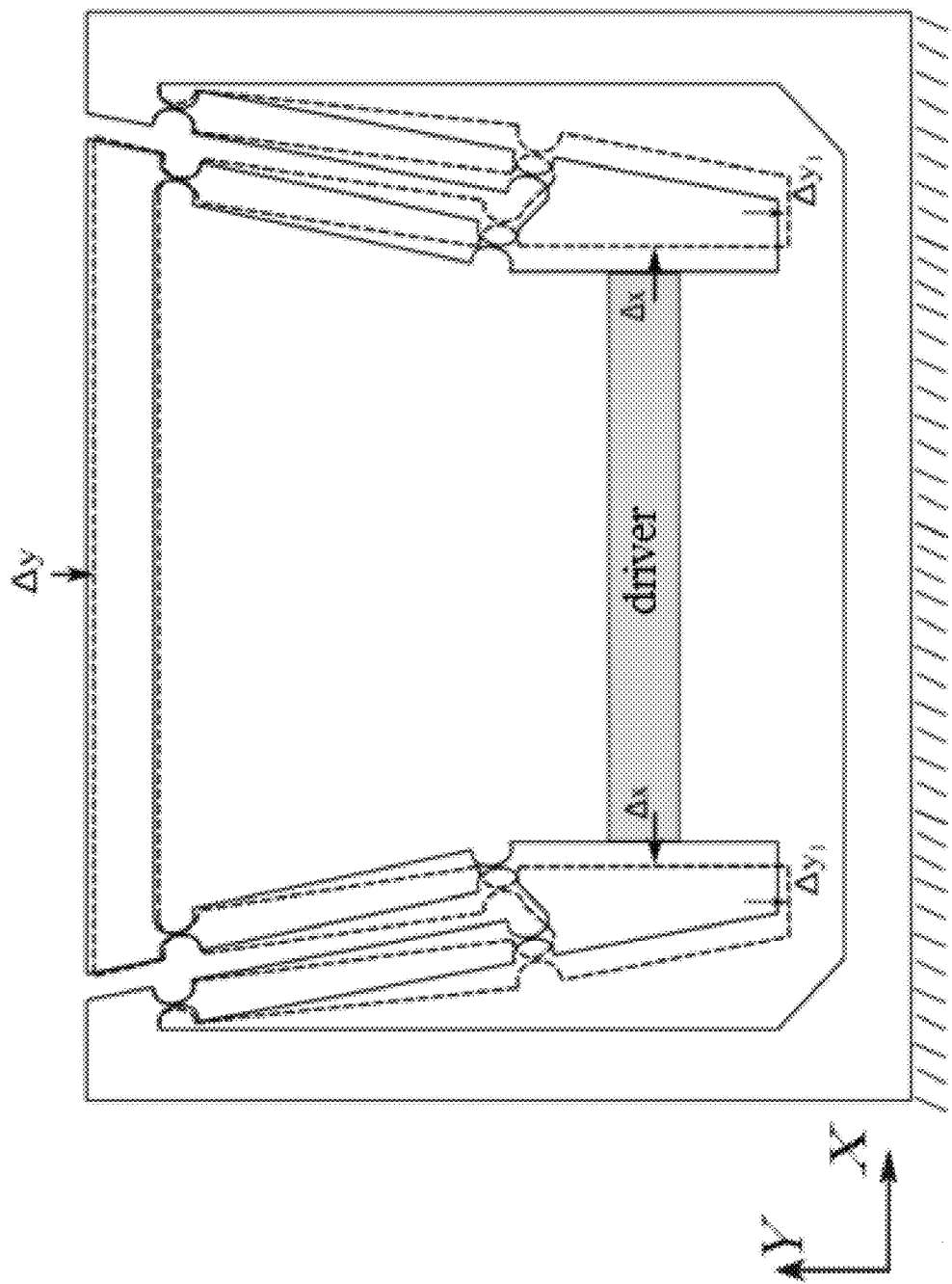
FIG. 2 is a schematic diagram of concentrated flexibility type motion in another embodiment of the invention.
Figure 3:
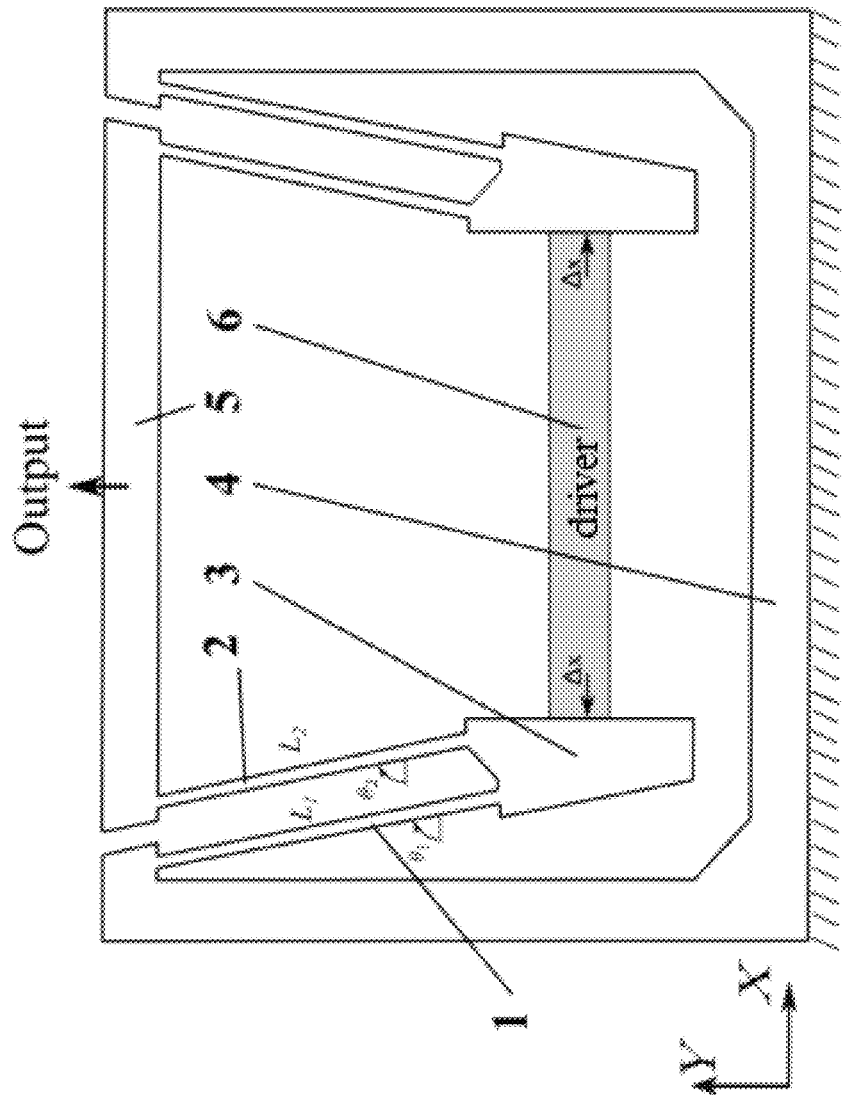
FIG. 3 is a schematic diagram of a distributed flexibility type structure in another embodiment of the invention.
Figure 4:
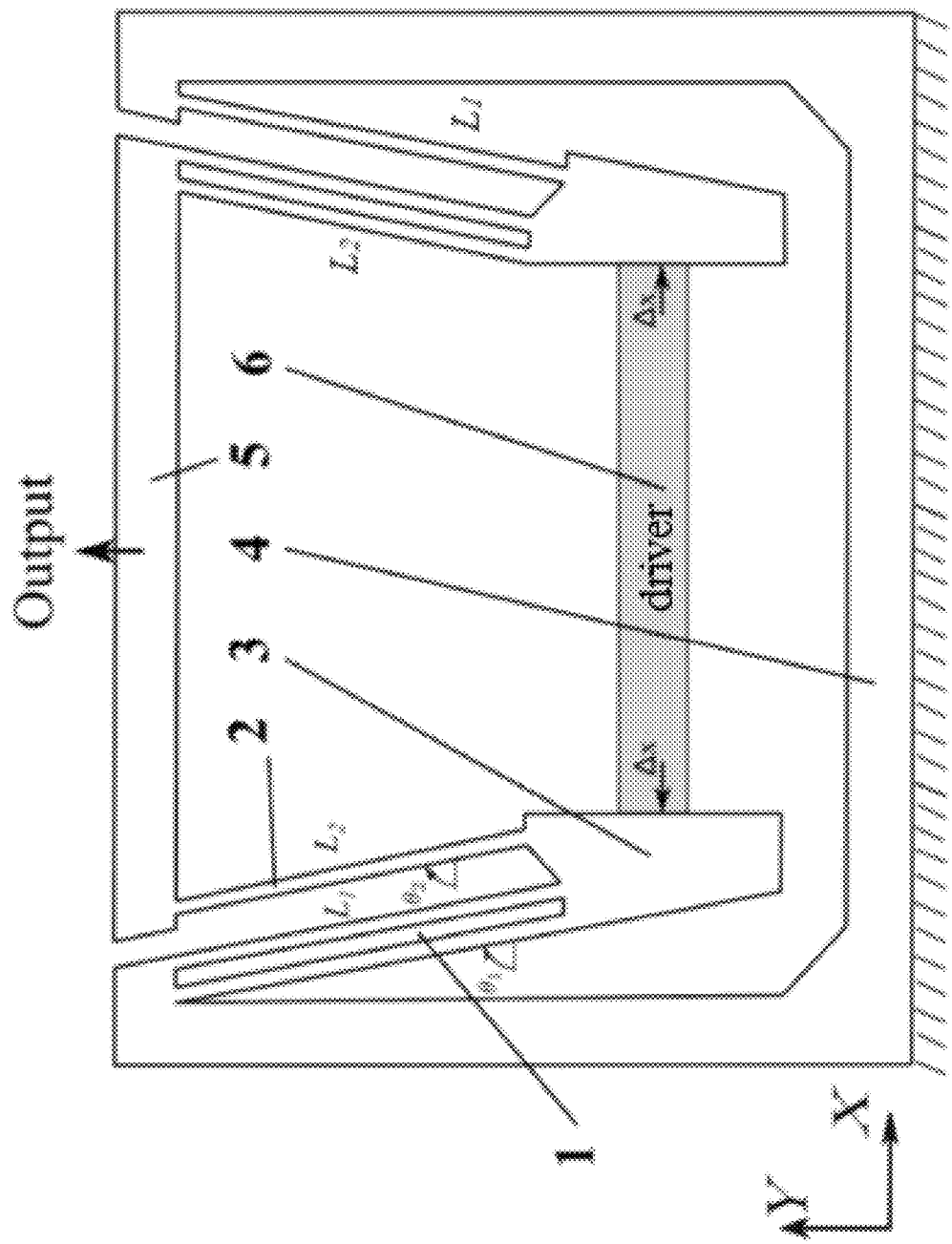
FIG. 4 is a schematic diagram of a just-constrained structure in another embodiment of the invention.
Figure 5:
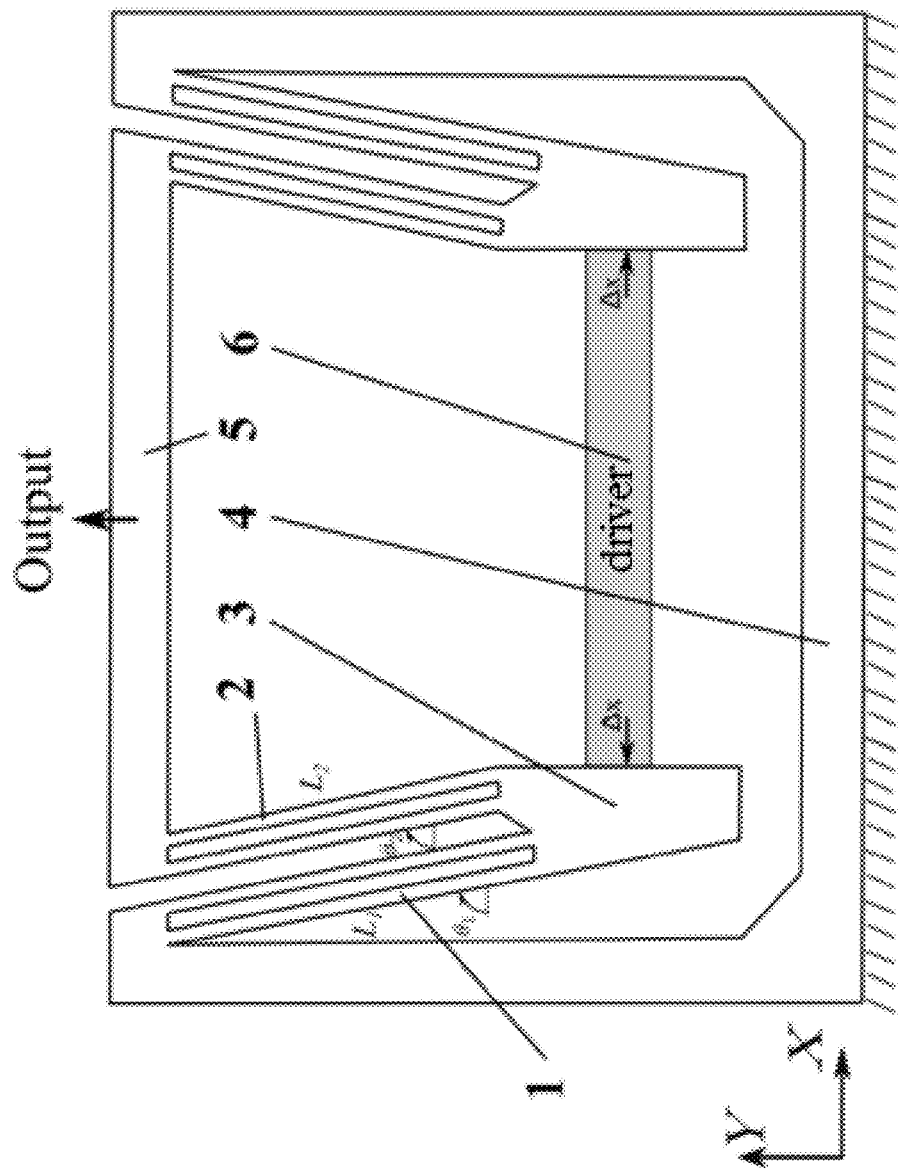
FIG. 5 is a schematic diagram of an over-constrained structure in another embodiment of the invention.

As shown in FIG. 1 and FIG. 2, the working principle of the displacement reducer is that firstly, a voltage is pre-applied to the driver 6 installed in the reducer, the driver generates an input displacement Δx in the X direction, and the input displacement is transmitted to the outer compliant branch chain module 1 and the inner compliant branch chain module 2 through the rigid connecting blocks 3; the displacement is output in the Y reverse direction after being converted by the outer compliant branch chain module 1 and is output in the Y forward direction after being converted by the inner compliant branch chain module 2, the two output displacements are superposed and offset to obtain a small output displacement, and reduction of the input displacement is achieved. The working principle of other differential displacement reducers (as shown in FIG. 3, FIG. 4 and FIG. 5) is the same as that of the differential displacement reducer in FIG. 1.

A transverse displacement Δx is provided for the rigid connecting block through a linear driver (such as a piezoelectric stack driver) to push the outer compliant branch chain module 1 and the inner compliant branch chain module 2.

For the outer compliant branch chain module, when the driver inputs the horizontal displacement of 2Δx, the rigid connecting blocks on the two sides not only generate a displacement Δx in the horizontal direction, but also generate a downward displacement $\Delta y_1$ in the vertical direction, and $\Delta y_1$ is approximately equal to $\Delta x/\tan(\theta_1)$.

For the inner compliant branch chain module, the transverse displacement Δx of the rigid connecting blocks on the two sides enables the reducer output block to generate a longitudinal displacement $\Delta y_2$ in the vertical direction relative to the rigid connecting blocks on the two sides, and $\Delta y_2$ is approximately equal to $\Delta x/\tan(\theta_2)$.

The output end of the whole reducer is the output block, and the output displacement relative to the base is $\Delta y=\Delta y_2-\Delta y_1$, that is to say, large-scale reduction of the input displacement of the driver can be realized by utilizing mutual offset of the displacements of the two compliant branch chain modules. By changing the design parameters of the inner compliant branch chain module and the outer compliant branch chain module, displacement reduction of any proportion can be obtained (for example, under the extreme condition, when the design parameters of the two bridge type compliant modules are completely the same, the output displacement of the whole reducer is zero, which means an infinite reduction ratio).

In another embodiment, two concentrated flexibility type (notch compliant hinge) compliant branch chain modules can be fully or partially replaced by distributed flexibility type (long beam or reed) compliant branch chain modules.

In the embodiment of FIG. 1, the piezoelectric driver 6 generates an X-direction displacement by changing the voltage on the piezoelectric stack driver 6, when the voltage is increased, the piezoelectric stack driver 6 generates an X-direction extension motion, and when the voltage is reduced, the piezoelectric stack driver 6 generates an X-direction contraction motion. The X-direction displacement drives the two rigid connecting blocks 3 connected with the piezoelectric stack driver 6 to generate the X-direction displacement, and the X-direction displacement drives the notch compliant hinges in the outer compliant branch chain modules 1 and the inner compliant branch chain modules 2 which are connected with the rigid connecting blocks to generate deformation, so that the two compliant branch chain modules generate opposite Y-direction displacements: and after the two opposite Y-direction displacements are mutually superposed and offset, a very small Y-direction displacement is output on the output block 5.

In another embodiment, the invention further discloses a differential compliant displacement reducer which includes outer compliant branch chain modules, inner compliant branch chain modules, rigid connecting blocks, a fixing block, an output block and a driver. The outer compliant branch chain modules and the inner compliant branch chain modules are arranged outside the two rigid connecting blocks, and the driver is arranged between the two rigid connecting blocks; the outer compliant branch chain modules and the inner compliant branch chain modules have the same deviation direction, more rigorously, the deformation motion direction is the same; the fixing block and the output block jointly form a rectangular frame, the outer compliant branch chain modules, the inner compliant branch chain modules, the rigid connecting blocks and the driver are all wrapped in the rectangular frame, and a compact overall structure is formed.

The structure of the outer compliant branch chain module and the structure of the inner compliant branch chain module can be of a concentrated flexibility type or a distributed flexibility type, the two ends of the outer compliant branch chain module are connected with the rigid connecting block and the fixing block respectively, and the two ends of the inner compliant branch chain module are connected with the rigid connecting block and the output block respectively.

Furthermore, the compliant branch chains are concentrated flexibility type branch chains or distributed flexibility type branch chains.

Furthermore, notches are symmetrically formed in the two sides of the two ends of each concentrated flexibility type compliant branch chain module, and compliant hinges, namely notch compliant hinges, are formed on the inner sides of the notches.

Further, the distributed flexibility type compliant branch chain module is a whole section of compliant beam; the compliant beam is a long beam or a reed.

Furthermore, the outer compliant branch chain module and the inner compliant branch chain module are arranged in the same direction, $\theta_1$ and $\theta_2$ are recorded as angles from the horizontal line in the clockwise direction to the outer compliant branch chain module and the inner compliant branch chain module in the left half part respectively, and the $\theta_1$ and the $\theta_2$ should be in the range of 0-90 degrees at the same time.

Furthermore, the fixing block is connected with the rack, and the output block is the output end of the whole mechanism.

As shown in FIG. 1 to FIG. 5, the differential compliant displacement reducer includes outer compliant branch chain modules 1, inner compliant branch chain modules 2, rigid connecting blocks 3, a fixing block 4, an output block 5 and a driver 6, the outer compliant branch chain modules 1 and the inner compliant branch chain modules 2 are all arranged outside the two rigid connecting blocks 3, and the driver 6 is arranged between the two rigid connecting blocks 3; the outer compliant branch chain modules 1 and the inner compliant branch chain modules 2 are the same in deformation motion direction so as to generate differential motion, the fixed block 4 and the output block 5 jointly form a rectangular frame, and the outer compliant branch chain modules 1, the inner compliant branch chain modules 2, the rigid connecting blocks 3 and the driver 6 are all sealed in the rectangular frame to form a compact overall structure.

In another embodiment, the structure of the outer compliant branch chain module 1 and the structure of the inner compliant branch chain module 2 can be of a concentrated flexibility type or a distributed flexibility type, the two ends of the outer compliant branch chain module 1 are connected with the rigid connecting block 3 and the fixing block 4 respectively, and the two ends of the inner compliant branch chain module 2 are connected with the rigid connecting block 3 and the output block 5 respectively.

In another embodiment, the two compliant branch chain modules can be of a concentrated flexibility type or a distributed flexibility type (for the concentrated flexibility type structure, the compliant branch chain module is connected to the fixing block, the output block and the connecting block through the two notch compliant hinges).

The following is a more detailed description in combination with the relevant drawings:

FIG. 1 is a planar graph of the differential compliant displacement reducer and discloses the following solution:

the differential compliant displacement reducer, including:

two compliant branch chain modules, two rigid connecting blocks (3) correspondingly connected with the two compliant branch chain modules, a fixing block (4), an output block (5) and a driver (6) arranged between the two rigid connecting blocks (3);

each compliant branch chain module includes a corresponding outer compliant branch chain module (1) and a corresponding inner compliant branch chain module (2), one end of the outer compliant branch chain module (1) and one end of the inner compliant branch chain module (2) are respectively connected to one end of the rigid connecting block (3);

the other end of the outer compliant branch chain module (1) is connected to the fixed block (4);

the other end of the inner compliant branch chain module (2) is connected to the output block (5);

the fixing block (4) and the output block (5) jointly form an outer frame, all the outer compliant branch chain modules (1), all the inner compliant branch chain modules (2), all the rigid connecting blocks (3) and the driver (6) are sealed in the outer frame to form a compact overall structure, and in addition, from the outside to the inside of the outer frame, the outer side of the outer compliant branch chain module (1), the inner side of the outer compliant branch chain module (1), the outer side of the inner compliant branch chain module (2) and the inner side of the inner compliant branch chain module (2) are arranged in sequence.

It can be found that the bridge type differential displacement reducer shown in FIG. 1 includes outer compliant branch chain modules 1, inner compliant branch chain modules 2, rigid connecting blocks 3 and a driver 6. The outer compliant branch chain module 1 and the inner compliant branch chain module 2 are bridge type mechanisms. The number of the compliant branch chains in the outer compliant branch chain module 1 and the inner compliant branch chain module 2 can be determined according to the requirements of flexibility, rotation rigidity and the like of the displacement reducer. The outer compliant branch chain module 1 shown in FIG. 1 includes a compliant branch chain. The inner compliant branch chain module 2 also includes a compliant branch chain. The fixed section of the outer compliant branch chain module 1 is connected with the ground, and the output block 5 connected with the inner compliant branch chain module 2 is the output end of the whole reducer. As shown in FIG. 1, the driver is fixedly connected with the two rigid connecting blocks 3, and the driver 6 provides linear input to enable the two rigid connecting blocks 3 to move outwards or contract inwards. As shown in FIG. 1, the compliant branch chains in the outer compliant branch chain module 1 and the inner compliant branch chain module 2 are in a concentrated flexibility type (notch compliant hinge). Compliant hinges are arranged at the two ends of the centralized flexibility type branch chain and can be arranged horizontally, vertically or along the branch chain. In FIG. 1, the direction of the compliant hinge is the direction along the compliant branch chain.

Exemplary, the rigid connecting block (3) is directly connected with one end of the driver through one end of the rigid connecting block (3); the driver can be directly connected with the rigid connecting block and can also be connected with the rigid connecting block through balls and the like.

In one embodiment, the outer compliant branch module (1) is closer to the fixed block (4) than the inner compliant branch module (2), and the inner compliant branch module (2) is closer to the output block (5) than the outer compliant branch module (1).

According to the invention, the branch chain can include more than one hinge, and the hinge can be deformed. The differential motion is the difference between the upper deformation and the lower deformation. The outer compliant branch chain modules and the inner compliant branch chain modules are the same in deformation motion direction, and the differential motion can be caused due to deformation of the outer compliant branch chain modules and the inner compliant branch chain modules.

The fixing block (4) is of a symmetrical structure, such as a ⊔-shaped semi-frame structure, and the output block (5) is of a ⊔-shaped upper closed object.

FIG. 2 is a plan view of a compact bridge type differential reducer in a possible motion according to the implementation of the invention. First, a voltage is applied to the driver 6. The driver 6 generates an input displacement $2\Delta x$ in the X direction, and the input displacement $\Delta x$ is transmitted to the outer compliant branch chain modules 1 and the inner compliant branch chain modules 2 through the rigid connecting blocks 3. For the outer compliant branch chain modules 1, when the input displacement of the driver 6 is equal to $2\Delta x$, the rigid connecting blocks 3 on the two sides not only generate a horizontal displacement, but also generate a vertical displacement $\Delta y_1$ relative to the ground ($\Delta y_1$ is approximately equal to $-\Delta x/\tan(\theta_1)$). For the inner compliant branch chain modules 2, the input displacement $2\Delta x$ of the rigid connecting block 3 enables the output block 5 to generate a vertical displacement $\Delta y_2$ ($\Delta y_2$ is approximately equal to $\Delta x/\tan(\theta_2)$) relative to the rigid connecting block 3. Relative to the ground, the output displacement $\Delta y$ of the whole reducer is equal to $\Delta y_2 - \Delta y_1$. By changing the values of $\theta_1$ and $\theta_2$, the reduction ratio of any bridge type differential displacement reducer can be obtained (for example, when $\theta_1$ and $\theta_2$ are completely the same under extreme conditions, the output displacement $\Delta y$ is 0).

According to a preferable embodiment of the invention, the compliant branch chains of the outer compliant branch chain module 1 and the inner compliant branch chain module 2 can be completely or partially replaced by the distributed compliant beams. FIG. 3 and FIG. 4 show two examples of the differential displacement reducer. As shown in FIG. 3, the compliant branch chains of the outer compliant branch chain module 1 and the inner compliant branch chain module 2 are both replaced by the distributed compliant beams.

According to another preferable embodiment of the invention, the number of the compliant branch chains of the outer compliant branch chain module 1 and the number of the compliant branch chains of the inner compliant branch chain module 2 can be different, so that the rigidity of the reducer is improved. FIG. 4 is an example of a differential displacement reducer. As shown in FIG. 4, the number of the compliant branch chains on the two sides of the outer compliant branch chain module 1 is different, two compliant branch chains are arranged on the left side and one on the right side. The number of the compliant branch chains on the two sides of the inner compliant branch chain module 2 is different, namely, one compliant branch chain is arranged on the left side and two compliant branch chains are arranged on the right side.

As shown in FIG. 5, the number of the compliant branch chains on the two sides of the outer compliant branch chain module 1 and the number of the compliant branch chains on the two sides of the inner compliant branch chain module 2 are the same, and two distributed compliant branch chains are arranged on each side. The number of the compliant branch chains is not limited to one or two on one side and can also be more.

That is to say, from FIG. 1 to FIG. 5, the invention discloses a differential compliant displacement reducer which includes outer compliant branch chain modules, inner compliant branch chain modules, rigid connecting blocks, a fixing block, an output block and a driver. The outer compliant branch chain modules and the inner compliant branch chain modules are arranged outside the two rigid connecting blocks, and the driver is arranged between the two rigid connecting blocks; the outer compliant branch chain modules and the inner compliant branch chain modules are the same in deformation motion direction so as to generate a differential motion, the fixed block and the output block jointly form an outer frame, and the outer compliant branch chain modules, the inner compliant branch chain modules, the rigid connecting blocks and the driver are all sealed in the outer frame to form a compact overall structure. In addition, in combination with the attached drawings, except for FIG. 4, the compact displacement reducer has the characteristic of symmetry from FIG. 1 to FIG. 5.

The compact displacement reducer adopts a frame structure, so that the space utilization rate of the mechanism is improved, and the compact displacement reducer is suitable for some environments with space limitation. The compact differential type displacement reducer can realize displacement transmission with large reduction ratio and high precision. According to all the embodiments, differential superposition of displacement can be achieved through the combination of the multiple (for example, four) compliant branch chain modules, the input displacement is transmitted to the outer compliant branch chain modules and the inner compliant branch chain modules through the rigid connecting blocks, and the displacement is output in the reverse direction after being converted by the outer compliant branch chain module; and the displacement is output in the forward direction after being converted by the inner compliant branch chain, and the two output displacements are superposed and offset to obtain a small output displacement, so that the reduction of the input displacement is realized. Therefore, a large displacement reduction ratio can be obtained, so that the resolution ratio and the precision of motion are greatly improved. For example, the displacements of the two compliant branch chain modules are mutually offset, and large-scale reduction of the input displacement of the driver is achieved. In addition, by changing design parameters of the inner compliant branch chain module and the outer compliant branch chain module, displacement reduction of any proportion can be achieved.

Figure 6:
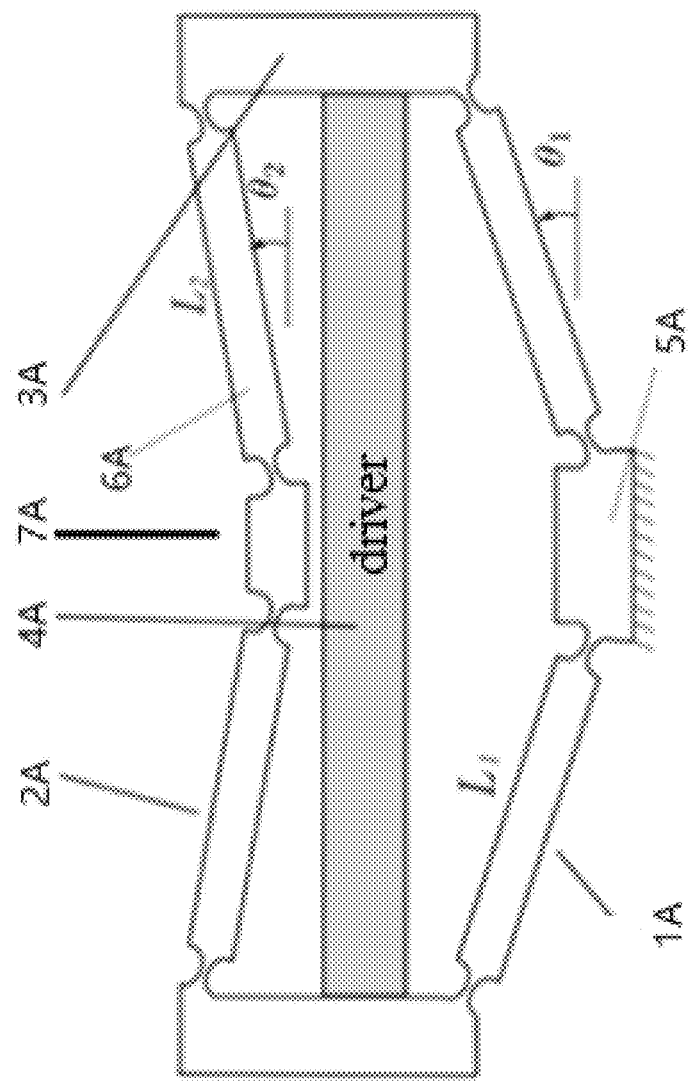
FIG. 6 is a schematic diagram of a concentrated flexibility type structure in another embodiment of the invention.

In the second part, the following is the second technical solution disclosed by the invention:

please refer to FIG. 6 to FIG. 13, in particular, taking FIG. 6 as an example, in one embodiment, the invention discloses a differential compliant displacement reducer which includes fixed half-bridge compliant modules 1A, movable half-bridge compliant modules 2A, rigid connecting blocks 3A and a driver 4A, the fixed half-bridge compliant modules 1A and the movable half-bridge compliant modules 2A are both arranged between the two rigid connecting blocks 3A to form an annular frame, and the driver 4A is arranged between the two rigid connecting blocks 3A in the annular frame; the bending directions of the fixed half-bridge compliant module 1A and the movable half-bridge compliant module 2A are the same;

the fixed half-bridge compliant module 1A and the movable half-bridge compliant module 2A each include a middle block 5A and a compliant branch chain 6A, one or more compliant branch chains 6A are arranged on the two sides of the middle block 5A respectively, and the number of the compliant branch chains 6A on the two sides of the middle block 5A is the same or different.

It can be understood that the solution discloses the bridge type differential compliant displacement reducer. The two half-bridge compliant modules are arranged in the same direction to generate a differential motion.

In another embodiment, the bridge type differential compliant displacement reducer includes fixed half-bridge compliant modules, movable half-bridge compliant modules, rigid connecting blocks and a piezoelectric driver.

In another embodiment, the two half-bridge compliant modules can be in a concentrated flexibility type or a distributed flexibility type (for the concentrated flexibility type structure, the two half-bridge compliant modules are connected to the fixing table and the connecting blocks through two notch compliant hinges respectively).

In another embodiment, the middle part of the fixed half-bridge compliant module is fixed, and the two ends of the fixed half-bridge compliant module are connected with the rigid connecting blocks.

In another embodiment, the two ends of the piezoelectric driver are fixed to the rigid connecting blocks, and the transverse displacement is input to the rigid connecting blocks.

Furthermore, the other ends of the rigid connecting blocks are connected with the two ends of the movable half-bridge compliant modules.

In another embodiment, the middle block of the movable half-bridge compliant module serves as an output end to output the reduced displacement outwards.

The working principle is as follows: in combination with FIG. 7, firstly, a voltage is pre-applied to the driver 4A installed in the bridge type reducer, the driver generates an input displacement $\Delta x$ in the X direction, the input displacement is transmitted to the fixed half-bridge compliant module 1A and the movable half-bridge compliant module 2A through the rigid connecting block 3A, and the displacement is output in the Y direction after being converted by the fixed half-bridge compliant module 1A; and after being converted by the movable half-bridge compliant module 2A, the displacement is output along the reverse direction of Y, and the two output displacements are superposed to obtain a small output displacement, so that the reduction of the input displacement is realized. The working principles of other differential displacement reducers (as shown in FIG. 8, FIG. 9, FIG. 10, FIG. 11, FIG. 12 and FIG. 13) are the same as that of the concentrated flexibility-type differential displacement reducer in FIG. 6.

Furthermore, a transverse displacement $\Delta x$ is provided for the rigid connecting block through a linear driver (such as a piezoelectric stack driver) to push the fixed half-bridge compliant module 1A and the movable half-bridge compliant module 2A.

For the fixed half-bridge compliant module, when the driver inputs a horizontal displacement of $2\Delta x$, the rigid blocks on the two sides generate a displacement $\Delta x$ in the horizontal direction and generate a downward displacement $\Delta y_1$ in the vertical direction, and $\Delta y_1$ is approximately equal to $\Delta x/\tan(\theta_1)$.

For the movable half-bridge compliant module, the transverse displacement $\Delta x$ of the rigid blocks on the two sides enables the output end of the reducer to generate a longitudinal displacement $\Delta y_2$ in the vertical direction relative to the rigid blocks on the two sides, and $\Delta y_2$ is approximately equal to $\Delta x/\tan(\theta_2)$.

The output end of the whole reducer is the middle block of the movable half-bridge compliant module, and the output displacement of the middle block relative to the base is $\Delta y = \Delta y2 - \Delta y1$, that is to say, the displacement of the upper half-bridge compliant module and the displacement of the lower half-bridge compliant module are mutually counteracted, and large-scale reduction of the input displacement of the driver can be achieved. By changing the design parameters of the two half-bridge compliant modules, displacement reduction in any proportion can be obtained (for example, under the extreme condition, when the design parameters of the two half-bridge compliant modules are completely the same, the output displacement of the whole reducer is zero, which means an infinite reduction ratio).

In another embodiment, two concentrated flexibility type (notch compliant hinge) half-bridge compliant modules can be all or partially replaced with distributed flexibility type (long beam or reed) half-bridge modules.

Other embodiments are as follows:

In the embodiment shown in FIG. 6, in order to enable the structure to be more compact and simpler and reduce the weight of the structure, the two ends of the middle block in the two half-bridge compliant modules are each connected with a concentrated flexibility type compliant branch chain. In the working process, the piezoelectric stack driver 4A generates an X-direction displacement by changing the voltage on the piezoelectric stack driver 4A, when the voltage is increased, the piezoelectric stack driver 4A generates an X-direction extension motion, and when the voltage is reduced, the piezoelectric stack driver 4A generates an X-direction contraction motion. The X-direction displacement drives two rigid connecting blocks 3A connected with the piezoelectric stack driver to generate an X-direction displacement, and the X-direction displacement drives the notch compliant hinges in the fixed half-bridge compliant amplification module 1A and the movable half-bridge compliant amplification module 2A connected with the rigid connecting blocks to generate deformation, so that the two half-bridge compliant modules generate opposite Y-direction displacements; and after the two opposite Y-direction displacements are mutually superposed and offset, a very small Y-direction displacement is output on the middle block 5A of the movable half-bridge compliant module.

In another embodiment, each of the fixed half-bridge compliant module and the movable half-bridge compliant module includes a middle section and a compliant branch chain, one or more compliant branch chains are arranged on the two sides of the middle section respectively, and the number of the compliant branch chains on the two sides of the middle section is the same or different.

Furthermore, the fixed section in the middle of the fixed half-bridge compliant module is connected with the rack, an output section is arranged in the middle of the movable half-bridge compliant module, and the output section is the output end of the whole reducer.

In another embodiment, each of the fixed half-bridge compliant module 1A and the movable half-bridge compliant module 2A includes a middle section and a compliant branch chain 6A, one or more compliant branch chains 6A are arranged on the two sides of the middle section respectively, and the number of the compliant branch chains 6A on the two sides of the middle section is the same or different.

In another embodiment, the middle section of the fixed half-bridge compliant module is a middle block 5A, and the two ends of the middle block 5A are connected with the rigid connecting blocks.

In another embodiment, the middle section of the movable half-bridge compliant module serves as an output section 7A to output the reduced displacement outwards.

FIG. 6 shows a planar graph of a differential displacement reducer, and also discloses the following solution:

the differential compliant displacement reducer, including:

two fixed half-bridge compliant modules (1A), two movable half-bridge compliant modules (2A), two rigid connecting blocks (3A), a middle block (5A), an output block (7A) and a driver (4A) between the two rigid connecting blocks (3A);

along the circumferential direction of the displacement reducer, a movable outer frame is formed by a first fixed half-bridge compliant module (1A), a first rigid connecting block (3A), a first movable half-bridge compliant module (2A), an output block (7A), a second movable half-bridge compliant module (2A), a second rigid connecting block (3A), a second fixed half-bridge compliant module (1A) and the middle block (5A);

for the fixed half-bridge compliant module (1A) and the movable half-bridge compliant module (2A) which are connected with the rigid connecting block, wherein, one end of the fixed half-bridge compliant module (1A) and one end of the movable half-bridge compliant module (2A) are connected to the two ends of the rigid connecting block (3A) respectively;

the other end of the fixed half-bridge compliant module (1A) is connected to the middle block (5A);

and the other end of the movable half-bridge compliant module (2A) is connected to the output block (7A).

For example, one end of the driver is connected between the two ends of the rigid connecting block (3A); the driver can be directly connected with the rigid connecting block and can also be connected with the rigid connecting block through balls and the like.

The bridge type differential displacement reducer shown in FIG. 6 is made of plate materials and includes the fixed half-bridge compliant modules 1A, the movable half-bridge compliant modules 2A, the rigid connecting blocks 3A and the driver 4A. The compliant branch chains 6A of the fixed half-bridge compliant module 1A and the movable half-bridge compliant module 2A are bridge type mechanisms. The number of the compliant branch chains 6A in the fixed half-bridge compliant module 1A and the movable half-bridge compliant module 2A can be determined according to the requirements of flexibility, rotational rigidity and the like of the displacement reducer.

The fixed half-bridge compliant module 1A shown in FIG. 6 includes two compliant branch chains 6A and a middle block 5A, and the two compliant branch chains 6A are symmetrically arranged at the two ends of the middle block 5A. The movable half-bridge compliant module 2A includes two compliant branch chains 6A and an output section 7A, and the two compliant branch chains 6A are symmetrically arranged at the two ends of the output section 7A. The middle block 5A of the fixed half-bridge compliant module 1A is connected with the ground, and the output section 7A of the movable half-bridge compliant module 2A is the output end of the whole reducer.

As shown in FIG. 6, a driver 4A is fixedly connected with the two rigid connecting blocks 3A, and the driver 4A provides linear input to enable the two rigid connecting blocks 3A to move outwards or contract inwards. As shown in FIG. 6, the compliant branch chains 6A in the fixed half-bridge compliant module 1A and the movable half-bridge compliant module 2A are in a concentrated flexibility type (notch compliant hinge). Compliant hinges are arranged at the two ends of the centralized compliant branch chains and can be arranged horizontally, vertically or along the branch chains. In FIG. 6, the direction of the compliant hinge is the direction along the compliant branch chain.

Figure 7:
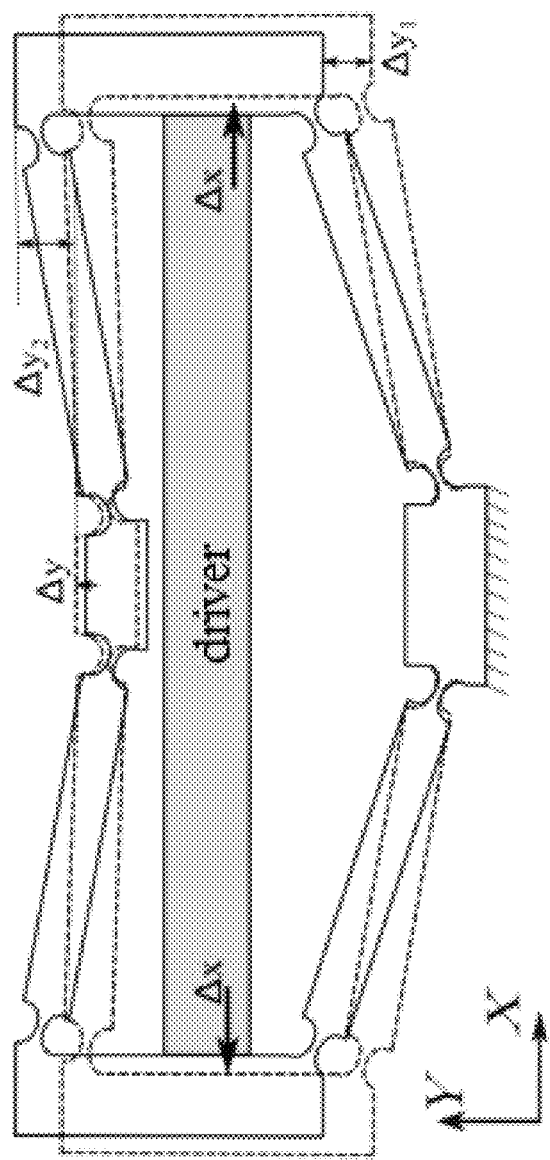
FIG. 7 is a schematic diagram of concentrated flexibility type motion in another embodiment of the invention.

FIG. 7 is a plan view of a bridge type differential reducer in a possible motion according to the implementation of the invention. First, a voltage is applied to a driver 4A. The driver 4A generates an input displacement $2\Delta x$ in the X direction, and the input displacement $\Delta x$ is transmitted to the fixed half-bridge compliant module 1A and the movable half-bridge compliant module 2A through the rigid connecting block 3A. For the fixed half-bridge compliant module 1A, when the input displacement of the driver 4A is equal to $2\Delta x$, the rigid connecting blocks 3A on the two sides not only generate a horizontal displacement, but also generate a vertical displacement $\Delta y_1$ relative to the ground ($\Delta y_1$ is approximately equal to—$\Delta x/\tan(\theta_1)$). For the movable half-bridge compliant module 2A, the input displacement $2\Delta x$ of the rigid connecting block 3A enables the output section 7A to generate a vertical displacement $\Delta y_2$ relative to the rigid connecting block 3A ($\Delta y_2$ is approximately equal to $\Delta x/\tan(\theta_2)$). Relative to the ground, the output displacement $\Delta y$ of the whole reducer is equal to $\Delta y_2 - \Delta y_1$. By changing the values of $\theta_1$ and $\theta_2$, the reduction ratio of any bridge type differential displacement reducer can be obtained (for example, when $\theta_1$ and $\theta_2$ are completely the same under extreme conditions, the output displacement $\Delta y$ is 0).

Figure 8:
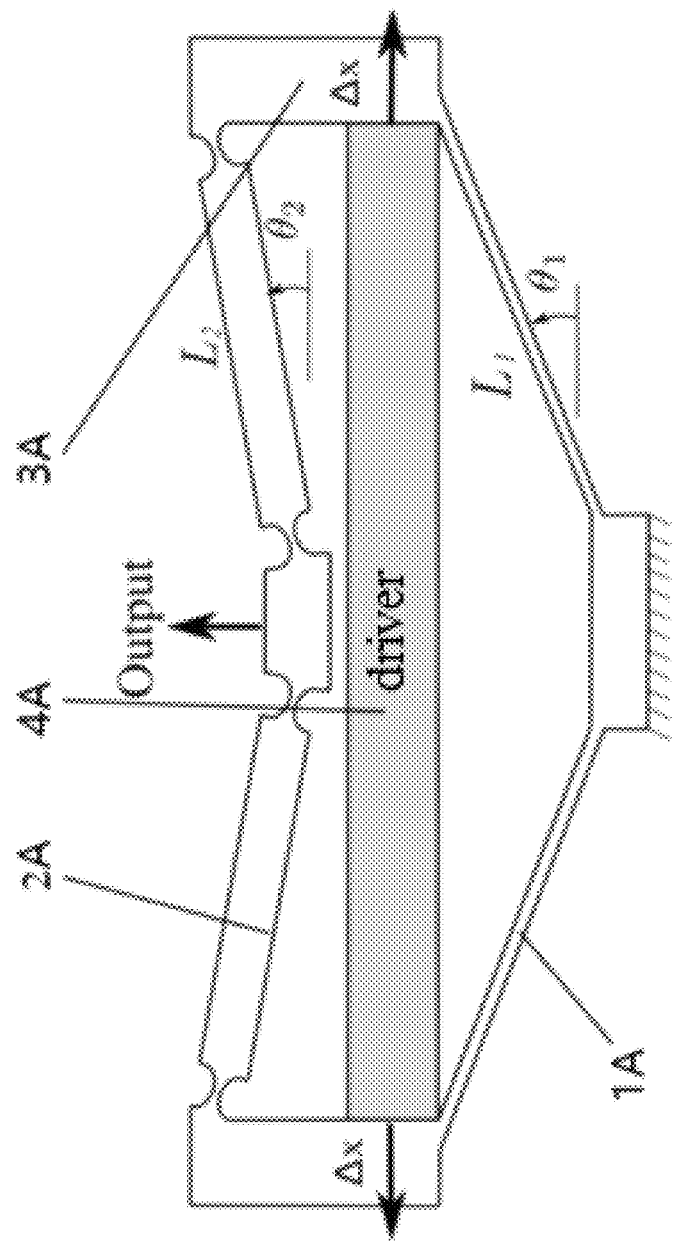
FIG. 8 is a schematic diagram of a mixed structure in another embodiment of the invention.
Figure 9:
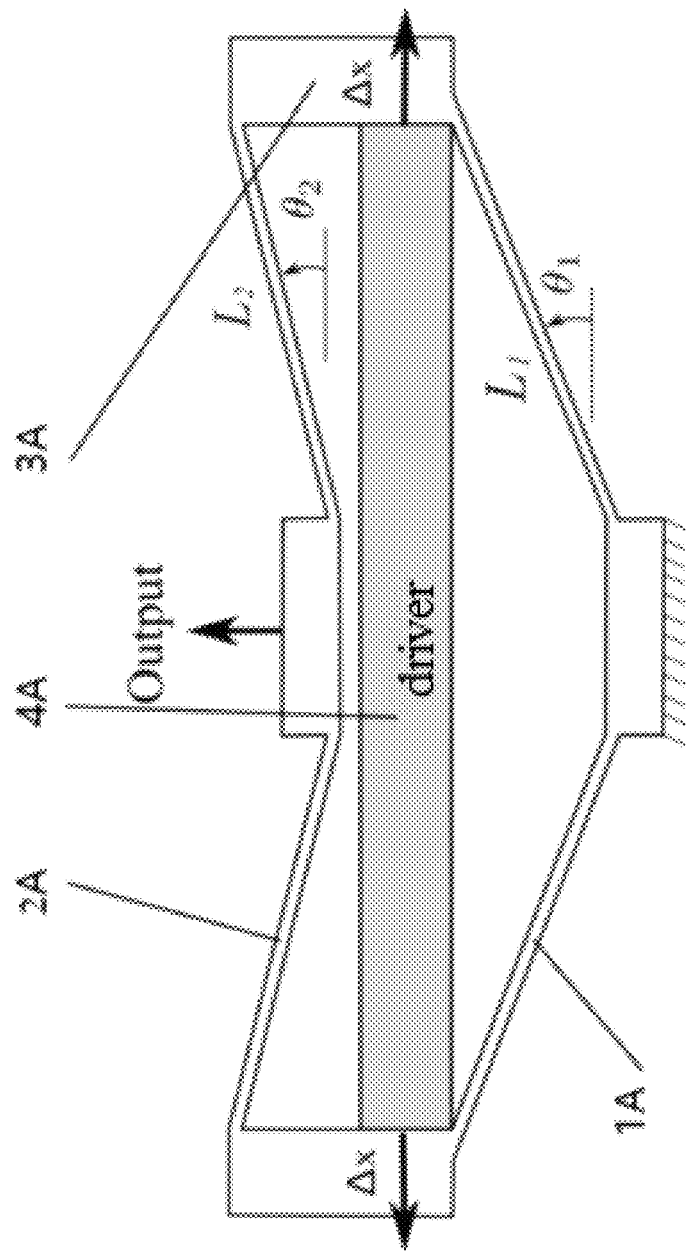
FIG. 9 is a schematic diagram of a distributed flexibility type structure in another embodiment of the invention.

According to a preferable embodiment of the invention, the compliant branch chains 6A of the fixed half-bridge compliant module 1A and the movable half-bridge compliant module 2A can be completely or partially replaced by the distributed compliant beams. FIG. 8 and FIG. 9 show two examples of the differential displacement reducer. As shown in FIG. 8, the compliant branch chains of the fixed half-bridge compliant module 1A are replaced by the distributed compliant beams. The compliant branch chains 6A of the fixed half-bridge compliant module 1A and the compliant branch chains 6A of the movable half-bridge compliant module 2A are replaced by distributed compliant beams.

Figure 10:
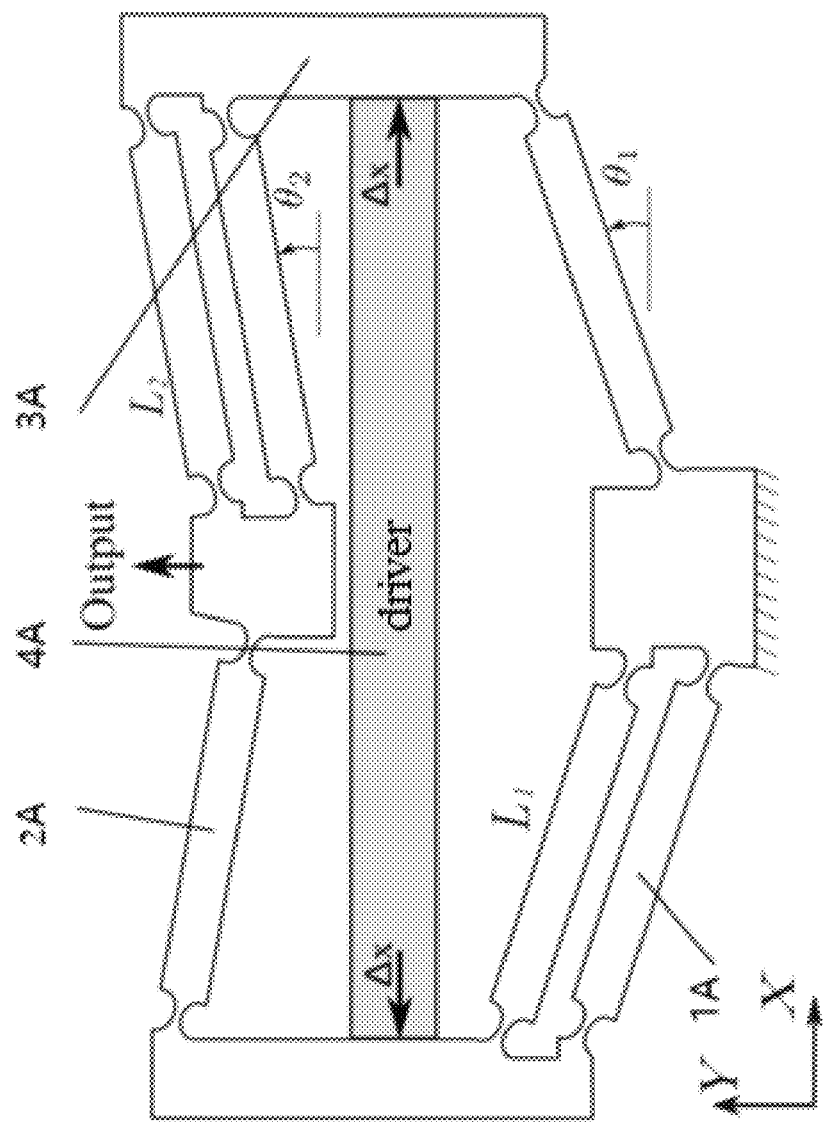
FIG. 10 is a schematic diagram of a just-constrained concentrated flexibility type structure in another embodiment of the invention.
Figure 11:
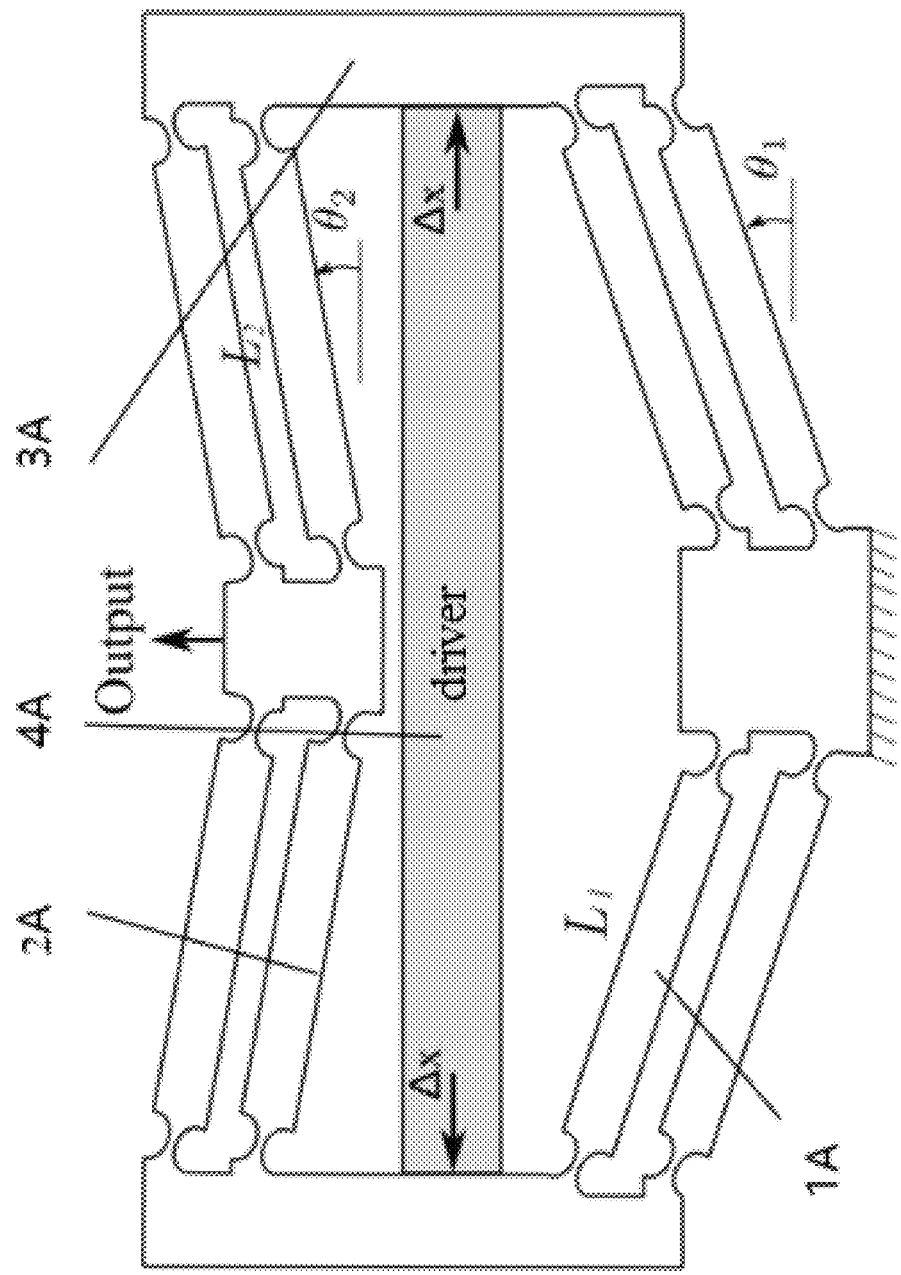
FIG. 11 is a schematic diagram of an over-constrained concentrated flexibility type structure in another embodiment of the invention.

According to another preferable embodiment of the invention, the number of the compliant branch chains 6A on the two sides of the middle block 5A (or the output section 7A) can be different, so that the rigidity of the mechanism is increased. FIG. 10 and FIG. 11 are two examples of the differential displacement reducer. As shown in FIG. 10, the number of the compliant branch chains 6A on the two sides of the middle block 5A is different, one compliant branch chain is arranged on the left side, and two compliant branch chains are arranged on the right side. The number of the compliant branch chains 6A on the two sides of the output section 7A is different, two compliant branch chains are arranged on the left side, and one compliant branch chain is arranged on the right side. As shown in FIG. 11, the number of the compliant branch chains 6A on the two sides of the middle block 5A is the same, and two compliant branch chains are arranged on each side. The compliant branch chains with the same number are also arranged on each of two sides of the middle block 5A, two on each side. The number of the compliant branch chains 6A is not limited to one or two on one side, but can be more.

Figure 12:
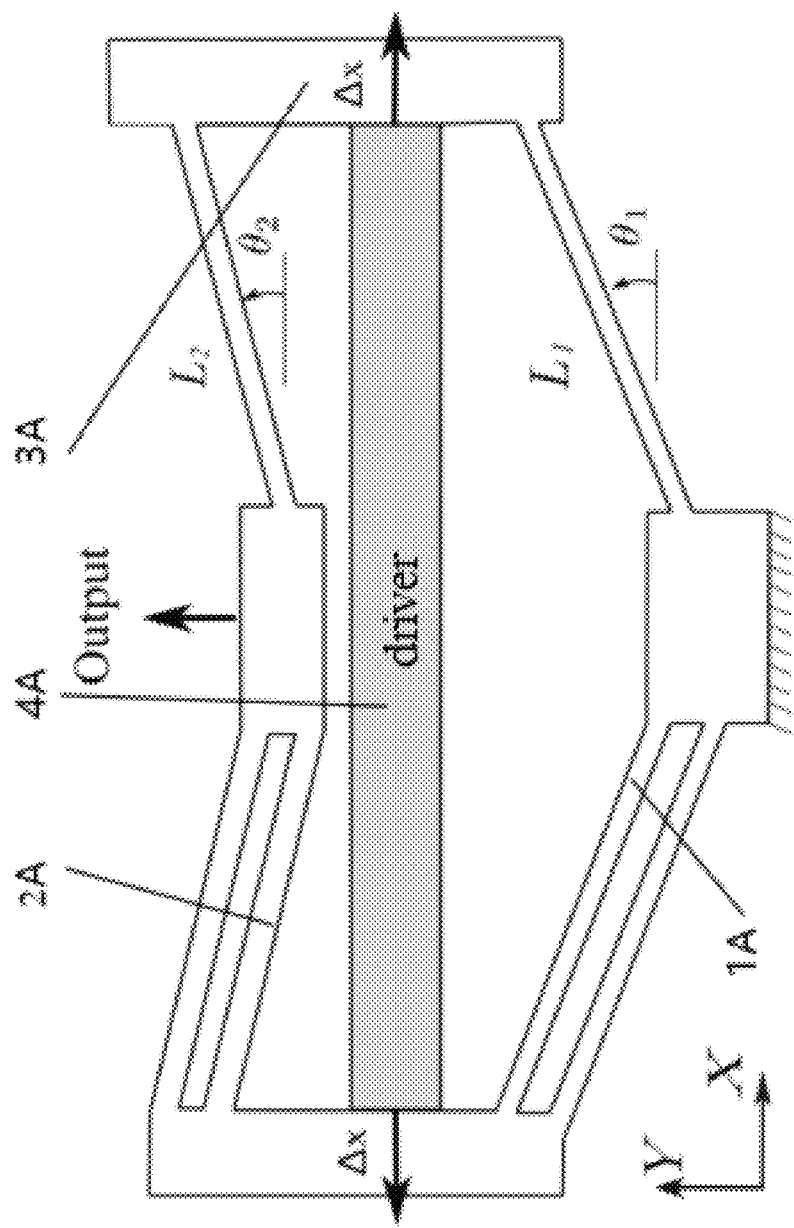
FIG. 12 is a schematic diagram of a just-constrained distributed flexibility type structure in another embodiment of the invention.
Figure 13:
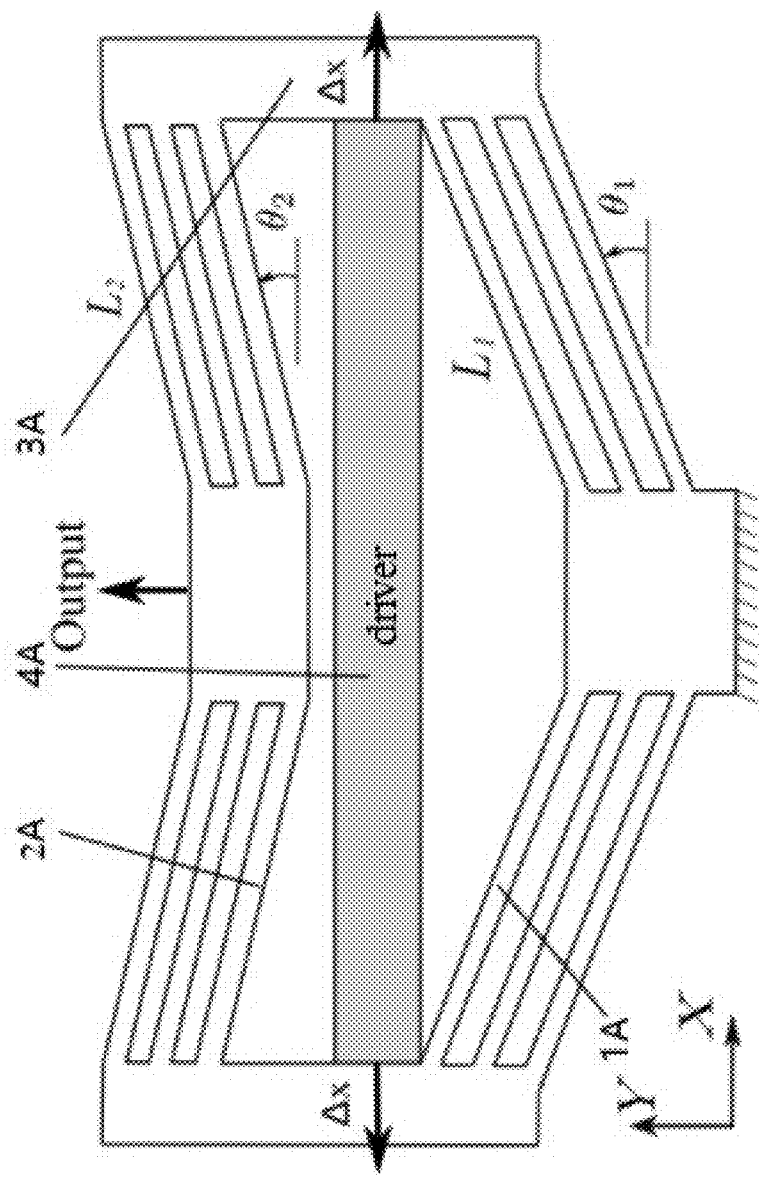
FIG. 13 is a schematic diagram of an over-constrained distributed flexibility type structure in another embodiment of the invention.

FIG. 12 is a plan view of a distributed compliant displacement reducer having different numbers of compliant branches 6A on either side of the middle block 5A. As shown in FIG. 12, two compliant beams are arranged on the left side of the middle block 5A, and one compliant beam is arranged on the right side of the middle block 5A. The output section 7A is also provided with two compliant beams on the left side and one compliant beam on the right side. As shown in FIG. 13, three compliant beams are arranged on each of the two sides of the middle block 5A, and each side of the output section 7A is also provided with three compliant beams.

In combination with all the drawings, in the displacement reducer disclosed by the invention:

from FIG. 6 to FIG. 13, except FIG. 10 and FIG. 12, the bridge type displacement reducer has the characteristic of symmetry;

the middle block 5A of the bridge type displacement reducer is equivalent to a fixed section and is of an integrated structure instead of a semi-frame structure composed of a plurality of different shapes; and the rigid connecting blocks are arranged on the outer sides of the compliant parts L1 and L2;

the bridge type displacement reducer is configured in the following manner:

from any end of the fixed section, the fixed section, the compliant part L1, the rigid connecting block 3, the compliant part L2 and the output section are sequentially arranged. The displacement reducer disclosed by the invention can also adopt a bridge type reducer, and compared with a compact type reducer, the bridge type reducer can effectively reduce the volume of the output end, improve the output rigidity and reduce the deformation of the output end, and is suitable for the condition that the tail end load is relatively large.

Figure 14:
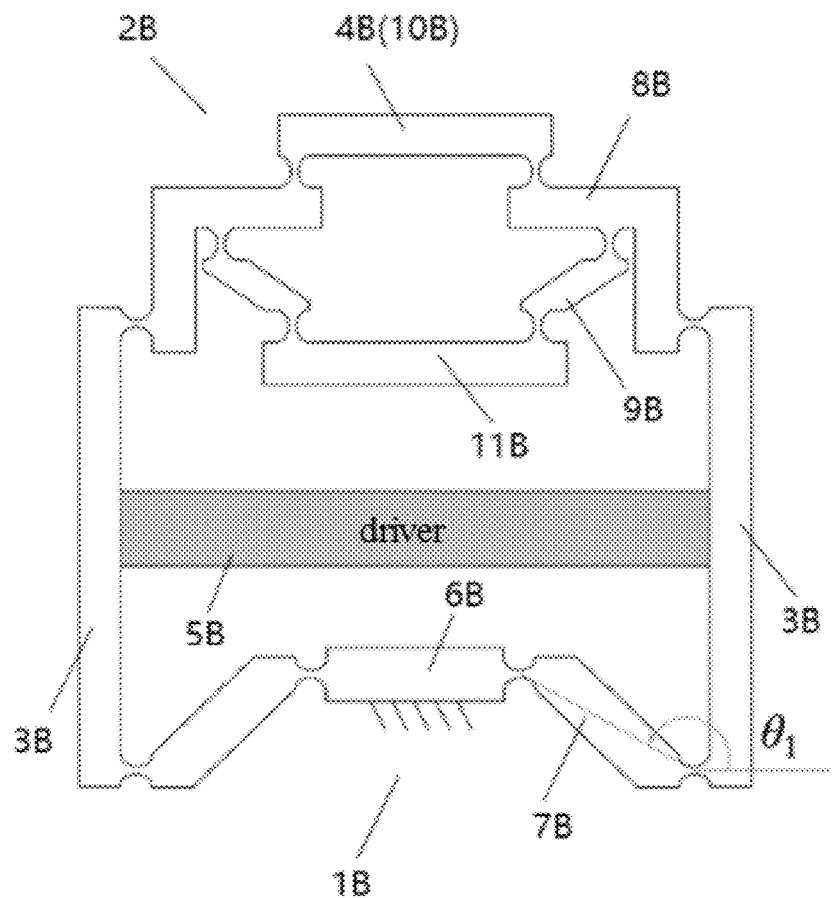
FIG. 14 a schematic diagram of a concentrated flexibility type structure in another embodiment of the invention, wherein the forward motion module and the reverse motion module are respectively a bridge type module and a Scott-Russell composite module, θ1 and θ2 are in a range of 90-180 degrees at the same time, and compliant hinges are orthogonally arranged.

In the third part, the following is the third technical solution disclosed by the invention:

please refer to FIG. 14 to FIG. 22, in particular, taking FIG. 14 as an example, in one embodiment, the invention further discloses a differential compliant displacement reducer which includes a forward motion module 1B, a reverse motion module 2B, total input sections 3B, a total output section 4B and a driver 5B. The two total input sections 3B are symmetrically arranged, and the forward motion module 1B and the reverse motion module 2B are both arranged between the two total input sections 3B; the outer end of the reverse motion module 2B serves as the total output section 4B; the two ends of the driver 5B are fixedly connected with the two total input sections 3B correspondingly, and the driver 5B provides displacement input for the forward motion module 1B and the reverse motion module 2B at the same time.

It can be understood that the forward and backward characteristics make the differential compliant displacement reducer become a differential compliant displacement reducer with input and output in different directions. However, the common characteristic with the above-mentioned two technical solutions are that the embodiment also realizes an outer frame, and the structure in the outer frame is relatively simple and belongs to a differential displacement reducer which is formed by extending upwards and downwards along the two ends of the driver.

In another embodiment, the total input sections 3B are symmetrically arranged on the two sides of the forward motion module 1B and the reverse motion module 2B; the forward motion module 1B and the reverse motion module 2B are combined in a manner of a combination of a bridge type module and a Scott-Russell composite module, a combination of the Scott-Russell composite module and the bridge type module, or a combination of the Scott-Russell composite module and the Scott-Russell composite module.

In another embodiment, the bridge type module includes a branch connection block 6B and bridge type branches 7B, one or more bridge type branches 7B being distributed on both sides of the branch connection block 6B.

In another embodiment, the bridge type branch 7B is a concentrated flexibility type branch or a distributed flexibility type branch; the two ends of the concentrated flexibility type branch are compliant hinges with notches in two sides, and the compliant hinges are horizontally, vertically or obliquely arranged; the distributed flexibility type branch is a whole section of compliant beam, and the compliant beam is a long beam or a reed.

In another embodiment, the Scott-Russell composite module includes a Scott-Russell upper connecting block 10B, a Scott-Russell lower connecting block 11B and Scott-Russell mechanisms, and the two Scott-Russell mechanisms are symmetrically connected to the two sides of the Scott-Russell upper connecting block 10B, and the two ends of the Scott-Russell lower connecting block 11B are respectively connected with the lower ends of the two Scott-Russell mechanisms.

In another embodiment, the Scott-Russell includes a Scott-Russell part I 8B and a Scott-Russell part II 9B; compliant hinges are arranged at the two ends of the Scott-Russell part I 8B and the two ends of the Scott-Russell part II 9B, and the compliant hinges are horizontally, vertically or obliquely arranged; one end of the Scott-Russell part II 9B is connected to the middle position of the Scott-Russell part I 8B, and the other end of the Scott-Russell part II 9B is connected with the Scott-Russell lower connecting block 11B: the two ends of the Scott-Russell part I 8B are respectively connected with the Scott-Russell upper connecting block 10B and the total input section 3B; and the connecting lines of the three ends of the Scott-Russell mechanism form a right triangle.

In another embodiment, when the forward motion module 1B is a Scott-Russell composite module, the Scott-Russell upper connecting block 10B is fixed; and when the forward motion module 1B is a bridge type module, the branch connecting block 6B of the module is fixed.

In another embodiment, when the reverse motion module 2B is a Scott-Russell composite module, the Scott-Russell upper connecting block 10B of the module is a total output section 4B; and when the reverse motion module 2B is a bridge type module, the branch connection block 6B of the module is a total output section 4B.

In another embodiment, with the counter-clockwise direction as the positive direction, $\theta_1$ is denoted as the angle from the horizontal line to the bridge type branch 7B in the bridge type module; when the Scott-Russell composite module is used as the forward motion module 1B, $\theta_2$ is recorded as the angle from the horizontal line to a connecting line of the two ends of the Scott-Russell part I 8B; when the Scott-Russell composite module is used as the reverse motion module 2, $\theta_2'$ is recorded as an angle from the horizontal line to a connecting line of the two ends of the Scott-Russell part I 8B, $\theta_1$ and $\theta_2$ are in a range of 0-90 degrees at the same time, $\theta_2$ and $\theta_2'$ are in a range of 0-90 degrees at the same time, and $\theta_1$ and $\theta_2'$ are in a range of 0-90 degrees at the same time or in a range of 90-180 degrees at the same time.

In another embodiment, the driver 5B provides a linear input to make the total input section 3B move along a straight line; the driver 5B is a piezoelectric stack driver, a magnetostrictive driver or a linear voice coil motor.

In another embodiment, after the driver 5B provides the transverse displacement input $\Delta x$ for the two total input sections 3B at the same time, the two ends of the forward motion module 1B and the two ends of the reverse motion module 2B are opened, the two ends of the forward motion module 1B generate a longitudinal displacement $\Delta y1$ relative to the fixed position, the two ends of the reverse motion module 2B generate a longitudinal displacement $\Delta y2$ relative to the total output section 4B. The $\Delta y1$ and the $\Delta y2$ are opposite in direction, and the actual displacement of the output end in the longitudinal direction is $\Delta y=\Delta y1-\Delta y2$. In other words, the displacement of the forward motion module 1B and the displacement of the reverse motion module 2B in the longitudinal direction are offset, and large-scale reduction of the input displacement of the driver 5B can be achieved. By changing design parameters of the forward motion module 1B and the reverse motion module 2B, displacement reduction of any proportion can be obtained.

Other embodiments are as follows:

Embodiment B1 in the embodiment of FIG. 14, the forward motion module 1B and the reverse motion module 2B of the invention are respectively a bridge type module and a Scott-Russell composite module. A bridge type branch 7B in the bridge type module is a concentrated flexibility type compliant branch, the compliant hinges used by the reducer are only horizontally and vertically arranged, and $\theta_1$ and $\theta_2$ are in the range of 90-180 degrees at the same time.

Figure 15:
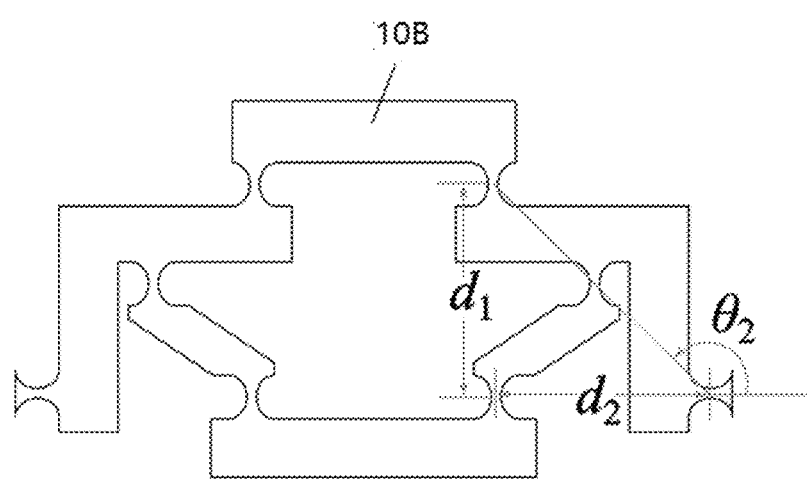
FIG. 15 is a structural diagram of a reverse motion module in another embodiment of the invention.

As shown in FIG. 15, firstly, a voltage is pre-applied to the driver 5B connected with the total input section 3B, and an input displacement $\Delta x$ is generated on the two sides of the driver 5B in the transverse direction at the same time.

For the bridge type module, the transverse displacement $\Delta x$ makes the longitudinal distance between the two ends of the bridge type module and the branch connection block 6B before and after deformation differ by $\Delta y1$ which is approximately equal to $|\Delta x/\tan(\theta_1)|$.

For the Scott-Russell composite module, the transverse displacement $\Delta x$ makes the longitudinal distance between the two ends of the Scott-Russell composite module and the Scott-Russell upper connecting block 10B before and after deformation differ by $\Delta y2$ which is approximately equal to $|\Delta x/\tan(\theta_2)|$.

The total output section 4B of the whole reducer is the Scott-Russell upper connecting block 10B, the output displacement of the Scott-Russell upper connecting block 10B relative to the base is yout, and yout=$\Delta y1-\Delta y2$.

The working principles of other differential displacement reducers (as shown in FIG. 16, FIG. 17, FIG. 18, FIG. 19 and FIG. 20) are the same as that of the concentrated flexibility type differential displacement reducer in FIG. 15.

Figure 21:
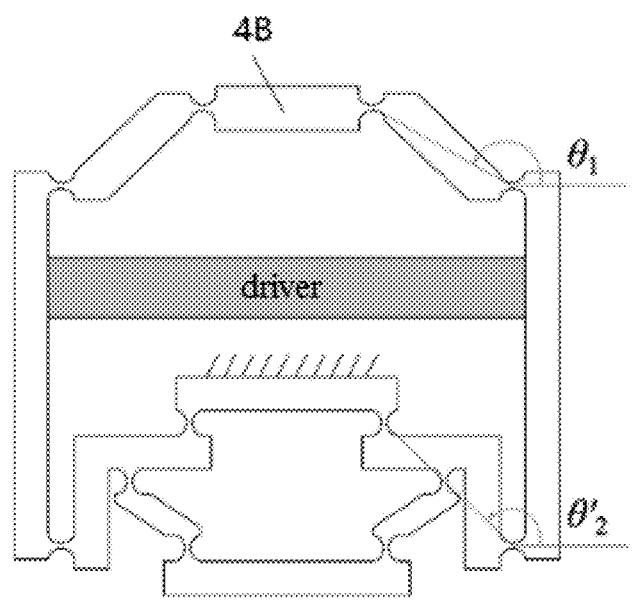
FIG. 21 (a) and FIG. 21 (b) are structural schematic diagrams of another embodiment of the invention, wherein the forward motion module and the reverse motion module are respectively a Scott-Russell composite module and a bridge type module.
Figure 21:
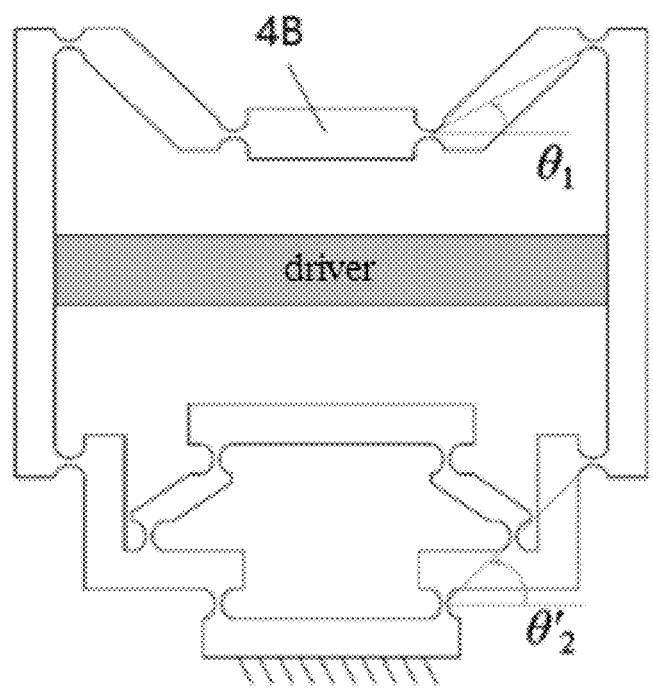

Embodiment B2 in the embodiments shown in the FIG. 21 (*a*) and the FIG. 21 (*b*), the forward motion module 1B and the reverse motion module 2B of the invention are respectively a Scott-Russell composite module and a bridge type module. A bridge type branch 7B in the bridge type module is a concentrated flexibility type compliant branch, and compliant hinges used by the reducer are only horizontally and vertically arranged. In the FIG. 7B, θ1 and θ2' in the left figure are in the range of 90-180 degrees at the same time, and θ1 and θ2' in the right figure are in the range of 90-180 degrees at the same time.

As shown in FIG. 21 (a), firstly, a voltage is pre-applied to the driver 5B connected with the total input section 3B, and an input displacement Δx is generated on the two sides of the driver 5B in the transverse direction at the same time.

For the Scott-Russell composite module, the transverse displacement Δx makes the longitudinal distance between the two ends of the Scott-Russell composite module and the Scott-Russell upper connecting block 10B before and after deformation differ by Δy2' which is approximately equal to |Δx/tan (θ2')|.

For the bridge type module, the transverse displacement Δx makes the longitudinal distance between the two ends of the bridge type module and the branch connecting block 6B before and after deformation differ by Δy1 which is approximately equal to |Δx/tan (θ$_1$)|.

The total output section 4B of the whole reducer is a branch connecting block 6B, the output displacement of the branch connecting block 6B relative to the base is yout, and yout=Δy2'−Δy1.

The working principle of the FIG. 21 (b) is the same as that of the concentrated flexibility type differential displacement reducer in FIG. 21 (a).

Figure 22:
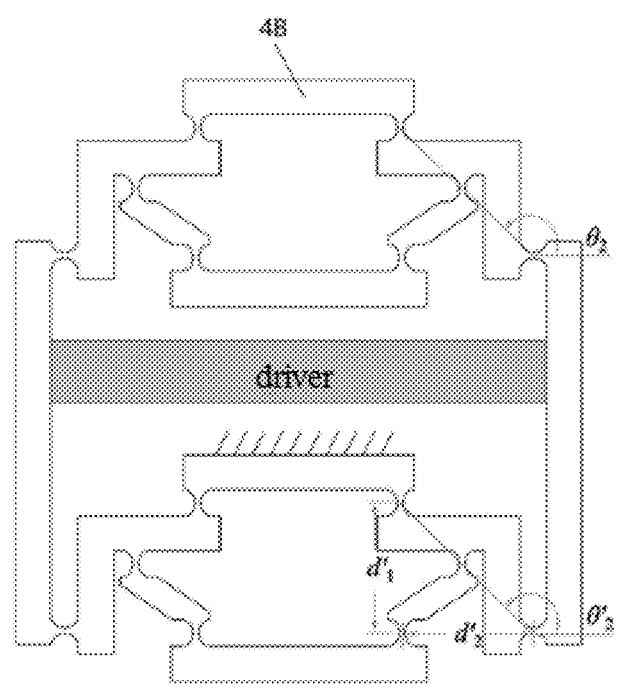
FIG. 22 is a structural schematic diagram of another embodiment of the invention, wherein both of the forward motion module and the reverse motion module are Scott-Russell composite modules.

Embodiment B3 in the embodiment of FIG. 22, the forward motion module 1B and the reverse motion module 2B are both Scott-Russell composite modules. The compliant hinges used by the reducer are only horizontally and vertically arranged, and θ1 and θ2' are in the range of 90-180 degrees at the same time.

As shown in FIG. 22, firstly, a voltage is pre-applied to the driver 5B connected with the total input section 3B, and an input displacement Δx is generated on the two sides of the driver 5B in the transverse direction at the same time.

For the Scott-Russell composite module serving as the forward motion module 1B, the transverse displacement Δx makes the longitudinal distance between the two ends of the Scott-Russell composite module and the Scott-Russell upper connecting block 10B before and after deformation differ by Δy2' which is approximately equal to |Δx/tan (θ2')|.

For the Scott-Russell composite module serving as the reverse motion module 2B, the transverse displacement Δx makes the longitudinal distance between the two ends of the Scott-Russell composite module and the Scott-Russell upper connecting block 10B before and after deformation differ by Δy2 which is approximately equal to |Δx/tan (θ$_2$)|.

The total output section 4B of the whole reducer is the Scott-Russell upper connecting block 10B of the reverse motion module 2B, the output displacement of the Scott-Russell upper connecting block 10B relative to the base is yout, and yout=Δy2'−Δy2.

In combination with the drawings such as FIG. 14, FIG. 15 and the like, the invention also discloses the following solution which is explained in detail as follows:
a differential compliant displacement reducer, including:
a forward motion module (1B), a reverse motion module (2B), two total input sections (3B), a total output section (4B) and a driver (5B);
one end of the forward motion module (1B) is connected with one end of the first total input section (3B), and the other end of the forward motion module (1B) is connected with one end of the second total input section (3B);
one end of the reverse motion module (2B) is connected with the other end of the first total input section (3B), and the other end of the reverse motion module (2B) is connected with the other end of the second total input section (3B);
the driver (5B) is arranged between the first total input section (3B) and the second total input section (3B);
the driver (5B) simultaneously provides displacement input for the forward motion module (1B) and the reverse motion module (2B).

It can be found that, in fact, the differential compliant displacement reducer with input and output in different directions is realized due to different forward and reverse designs of the displacement reducer.

In another embodiment,
the driver is directly connected with the two total input sections or connected with the two total input sections through balls and the like.

In another embodiment,
the joint of the driver (5B) and the total input section is located between the two ends of the total input section.

Figure 16:
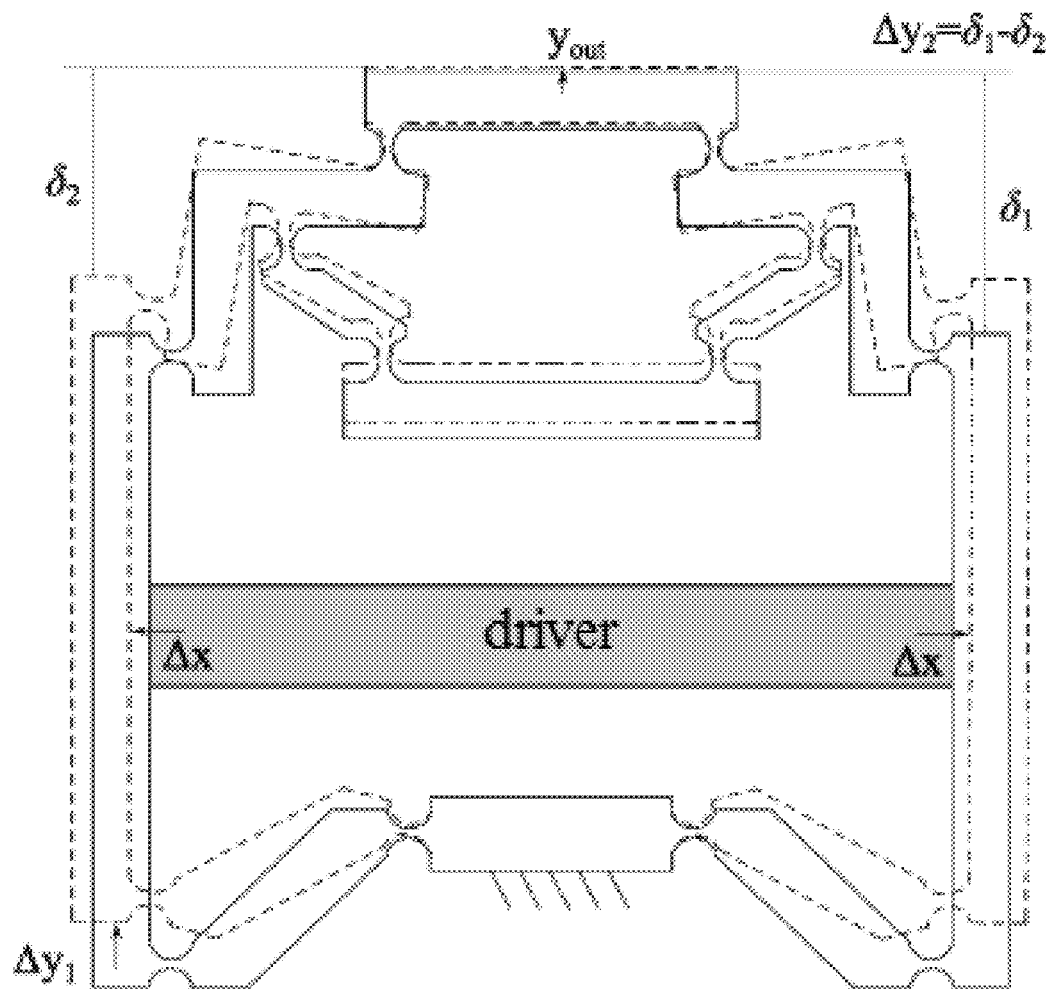
FIG. 16 is a schematic diagram of concentrated flexibility type motion in another embodiment of the invention, wherein the forward motion module and the reverse motion module are respectively a bridge type module and a Scott-Russell composite module, θ1 and θ2 are in a range of 90-180 degrees at the same time, and compliant hinges are orthogonally arranged.

FIG. 14 shows an example that the forward motion module and the reverse motion module of the invention are a bridge type module and a Scott-Russell composite module respectively. FIG. 15 is a Scott-Russell composite module figure. FIG. 16 is a motion schematic diagram that the forward motion module and the reverse motion module of the invention are respectively a bridge type module and a Scott-Russell composite module.

The bridge type module in FIG. 14 includes a branch connecting block and bridge type branches, and one bridge type branch is distributed on each side of the branch connecting block. The bridge type branches are concentrated flexibility type branches; the two ends of the concentrated flexibility type branch are compliant hinges with notches formed in the two sides, and the compliant hinges are horizontally and vertically arranged.

In FIG. 14, the Scott-Russell composite module includes a Scott-Russell upper connecting block, a Scott-Russell lower connecting block and Scott-Russell mechanisms, and the two Scott-Russell mechanisms are symmetrically connected to the two sides of the Scott-Russell upper connecting block. The two ends of the Scott-Russell lower connecting block are connected with the lower ends of the two Scott-Russell mechanisms respectively.

In FIG. 15, the Scott-Russell includes a Scott-Russell part I and a Scott-Russell part II, and the two ends of the Scott-Russell part I and the two ends of the Scott-Russell part II are compliant hinges, and the compliant hinges are horizontally and vertically arranged; one end of the Scott-Russell part II is connected to the middle position of the Scott-Russell part I, and the other end of the Scott-Russell part II is connected with the Scott-Russell lower connecting block; the two ends of the Scott-Russell part I are respectively connected with the Scott-Russell upper connecting block and the total input section; and the connecting lines of the three ends of the Scott-Russell mechanism form a right triangle.

When the forward motion module is a bridge type module, the branch connecting block of the forward motion module is fixed, and when the reverse motion module is a Scott-Russell composite module, the Scott-Russell upper connecting block of the reverse motion module is a total output section.

With the anticlockwise direction as the positive direction, $\theta_1$ is recorded as the angle from the horizontal line to the bridge type branch 7 in the bridge type module; when the Scott-Russell composite module is used as the reverse motion module 2B, $\theta_2$ is recorded as an angle from a horizontal line to a connecting line of the two ends of the Scott-Russell part I 8B. $\theta_1$ and $\theta_2$ are in the range of 90-180 degrees at the same time.

When the Scott-Russell composite module is used as a forward motion module 1, $\theta_2'$ is recorded as an angle from a horizontal line to a connecting line of the two ends of the Scott-Russell part I 8B;

$\theta_1$ and $\theta_2$ are in the range of 90-180 degrees at the same time, $\theta_2$ and $\theta_2'$ are in the range of 90-180 degrees at the same time, and $\theta_1$ and $\theta_2'$ are in the range of 0-90 degrees at the same time or in the range of 90-180 degrees at the same time.

The bridge module can include a branch connecting block 6B and bridge branches 7B, and one or more bridge branches 7B are distributed on the two sides of the branch connecting block 6B. In another embodiment, the driver provides linear input to enable the total input section to move along a straight line; the driver is a piezoelectric stack driver, a magnetostrictive driver or a linear voice coil motor.

As shown in FIG. 16, after the driver provides transverse displacement input $\Delta x$ for the two total input sections at the same time, the two ends of the forward motion module and the two ends of the reverse motion module are opened, the longitudinal displacement $\Delta y_1$ generated by the two ends of the forward motion module relative to the fixed position is approximately equal to $|\Delta x/\tan(\theta_1)|$, and the longitudinal displacement generated by the two ends of the reverse motion module relative to the total output section is $\Delta y_2$ which is approximately equal to $|\Delta x/\tan(\theta_2)|$, the $\Delta y_1$ and the $\Delta y_2$ are opposite in direction, and the actual displacement of the output end in the longitudinal direction is $\Delta y = \Delta y_1 - \Delta y_2$. In other words, the displacement of the forward motion module and the displacement of the reverse motion module in the longitudinal direction are offset, and large-scale reduction of the input displacement of the driver can be achieved. Displacement reduction at any ratio can be obtained by changing design parameters of the forward motion module and the reverse motion module.

Figure 17:
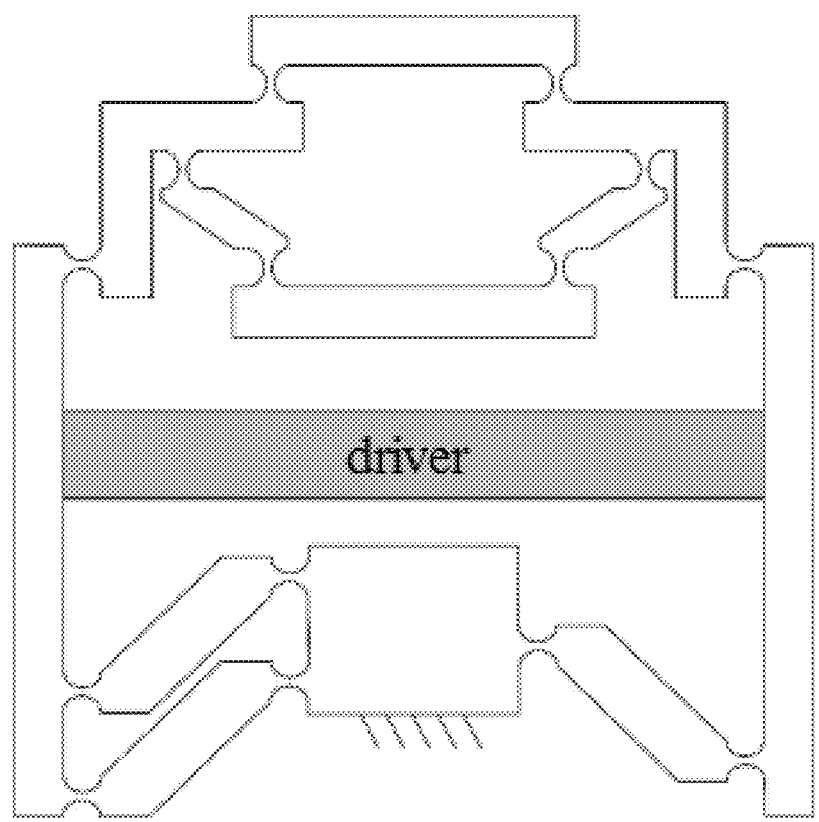
FIG. 17 is a schematic diagram of a bridge type module just-constrained structure in another embodiment of the invention, wherein the forward motion module and the reverse motion module are respectively a bridge type module and a Scott-Russell composite module.
Figure 18:
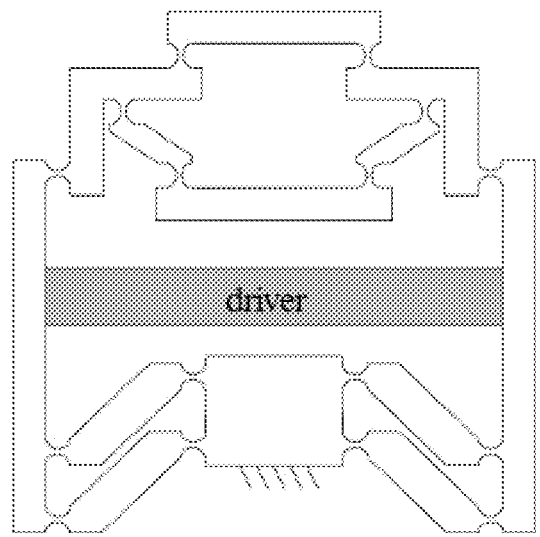
FIG. 18 is a schematic diagram of a bridge type module over-constrained structure in another embodiment of the invention, wherein the forward motion module and the reverse motion module are respectively a bridge type module and a Scott-Russell composite module.

FIG. 17 and FIG. 18 respectively show an example that the forward motion module and the reverse motion module are respectively a bridge type module and a Scott-Russell composite module.

The bridge type module includes a branch connecting block and bridge type branches, and one or more bridge type branches are distributed on the two sides of the branch connecting block. The bridge type branches are concentrated flexibility type branches; the two ends of the concentrated flexibility type branch are compliant hinges with notches formed in the two sides, and the compliant hinges are horizontally and vertically arranged.

A plurality of the bridge type branches are arranged on the left side of the branch connecting block in the half-bridge module in FIG. 17, and one bridge type branch is arranged on the right side; a plurality of the bridge type branches are arranged on the two sides of the branch connecting block in the half-bridge module in FIG. 18.

The Scott-Russell composite module in FIG. 17 and FIG. 18 includes a Scott-Russell upper connecting block, a Scott-Russell lower connecting block and Scott-Russell mechanisms, and the two Scott-Russell mechanisms are symmetrically connected to the two sides of the Scott-Russell upper connecting block; the two ends of the Scott-Russell lower connecting block are connected with the lower ends of the two Scott-Russell mechanisms respectively.

The Scott-Russell in FIG. 17 and FIG. 18 includes a Scott-Russell part I and a Scott-Russell part II, the two ends of the Scott-Russell part I and the two ends of the Scott-Russell part II are compliant hinges, and the compliant hinges are horizontally and vertically arranged; one end of the Scott-Russell part II is connected to the middle position of the Scott-Russell part I, and the other end of the Scott-Russell part II is connected with the Scott-Russell lower connecting block; the two ends of the Scott-Russell part I are respectively connected with the Scott-Russell upper connecting block and the total input section; and the connecting lines of the three ends of the Scott-Russell mechanism form a right triangle.

When the forward motion module is a bridge type module, the branch connecting block of the forward motion module is fixed, and when the reverse motion module is a Scott-Russell composite module, the Scott-Russell upper connecting block of the reverse motion module is the total output section.

The anticlockwise direction is taken as a positive direction, and $\theta_1$ is recorded as an angle from a horizontal line to a bridge type branch in the bridge type module; and when the Scott-Russell composite module is used as the reverse motion module, $\theta_2$ is recorded as an angle from a horizontal line to a connecting line of the two ends of the Scott-Russell part I. $\theta_1$ and $\theta_2$ are in the range of 90-180 degrees at the same time.

Figure 19:
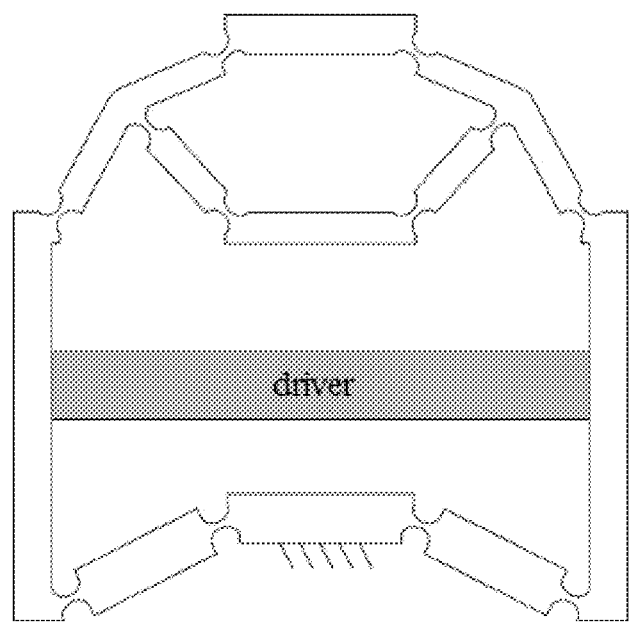
FIG. 19 is a schematic diagram of a structure in another embodiment of the invention, wherein the forward motion module and the reverse motion module are respectively a bridge type module and a Scott-Russell composite module, and compliant hinges are obliquely arranged.

FIG. 19 shows an example that the forward motion module and the reverse motion module are a bridge type module and a Scott-Russell composite module respectively.

In FIG. 19, the bridge type module includes a branch connecting block and bridge type branches, and one bridge type branch is distributed on each side of the branch connecting block. The bridge type branches are concentrated flexibility type branches: the two ends of each concentrated flexibility type branch are provided with compliant hinges with notches formed in the two sides, and the compliant hinges are arranged in an inclined mode.

In FIG. 19, the Scott-Russell composite module includes a Scott-Russell upper connecting block, a Scott-Russell lower connecting block and Scott-Russell mechanisms, and the two Scott-Russell mechanisms are symmetrically connected to the two sides of the Scott-Russell upper connecting block. The two ends of the Scott-Russell lower connecting block are connected with the lower ends of the two Scott-Russell mechanisms respectively.

In FIG. 19, the Scott-Russell includes a Scott-Russell part I and a Scott-Russell part II, and compliant hinges are arranged at the two ends of the Scott-Russell part I and the two ends of the Scott-Russell part II, and the compliant hinges are arranged in an inclined manner; one end of the Scott-Russell part II is connected to the middle position of the Scott-Russell part I, and the other end of the Scott-Russell part II is connected with the Scott-Russell lower connecting block; the two ends of the Scott-Russell part I are respectively connected with the Scott-Russell upper connecting block and the total input section; and the connecting lines of the three ends of the Scott-Russell mechanism form a right triangle.

When the forward motion module is a bridge type module, the branch connecting block of the forward motion module are fixed, and when the reverse motion module is a Scott-Russell composite module, the Scott-Russell upper connecting block of the reverse motion module is a total output section.

The anticlockwise direction is taken as a positive direction, and $\theta_1$ is recorded as an angle from a horizontal line to a bridge type branch in the bridge type module; and when the Scott-Russell composite module is used as a reverse motion module, $\theta_2$ is recorded as an angle from a horizontal line to a connecting line of the two ends of the Scott-Russell part I. $\theta_1$ and $\theta_2$ are in the range of 90-180 degrees at the same time.

Figure 20:
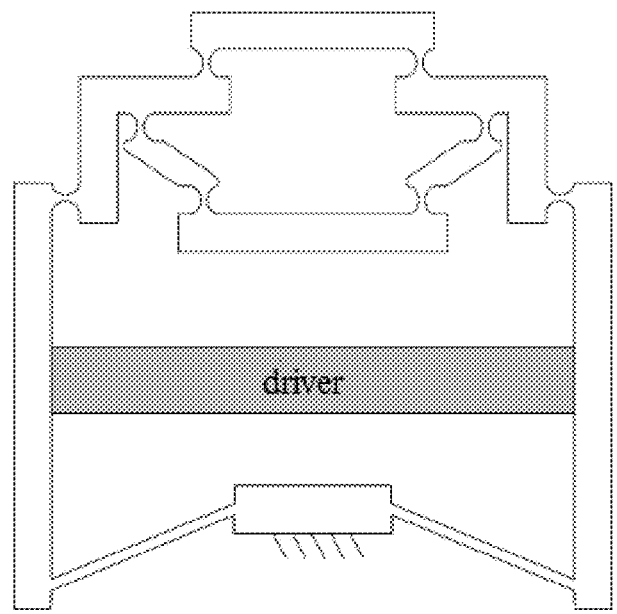
FIG. 20 is a schematic diagram of a distributed flexibility type structure in another embodiment of the invention, wherein the forward motion module and the reverse motion module are respectively a bridge type module and a Scott-Russell composite module.

FIG. 20 shows an example that the forward motion module and the reverse motion module are a bridge type module and a Scott-Russell composite module respectively.

The bridge type module in FIG. 20 includes a branch connecting block and bridge type branches, and one bridge type branch is distributed on each side of the branch connecting block. The bridge type branches are distributed flexibility type branches; the distributed flexibility type branch is a whole section of compliant beam, and the compliant beam is a long beam or a reed.

In FIG. 20, the Scott-Russell composite module includes a Scott-Russell upper connecting block, a Scott-Russell lower connecting block and Scott-Russell mechanisms, and the two Scott-Russell mechanisms are symmetrically connected to the two sides of the Scott-Russell upper connecting block. The two ends of the Scott-Russell lower connecting block are connected with the lower ends of the two Scott-Russell mechanisms respectively.

In FIG. 20, the Scott-Russell includes a Scott-Russell part I and a Scott-Russell part II, and the two ends of the Scott-Russell part I and the two ends of the Scott-Russell part II are compliant hinges, and the compliant hinges are horizontally and vertically arranged; one end of the Scott-Russell part II is connected to the middle position of the Scott-Russell part I, and the other end of the Scott-Russell part II is connected with a Scott-Russell lower connecting block; the two ends of the Scott-Russell part I are respectively connected with the Scott-Russell upper connecting block and the total input section; and the connecting lines of the three ends of the Scott-Russell mechanism form a right triangle.

When the forward motion module is a bridge type module, the branch connecting block of the forward motion module is fixed, and when the reverse motion module is a Scott-Russell composite module, a Scott-Russell upper connecting block of the reverse motion module is a total output section.

The anticlockwise direction is taken as a positive direction, and $\theta_1$ is recorded as an angle from a horizontal line to a bridge type branch in the bridge type module; and when the Scott-Russell composite module is used as a reverse motion module, $\theta_2$ is recorded as an angle from a horizontal line to a connecting line of the two ends of the Scott-Russell part I. $\theta_1$ and $\theta_2$ are in the range of 90-180 degrees at the same time.

FIG. 21 (*a*) and FIG. 21 (*b*) show an example that the forward motion module and the reverse motion module are a Scott-Russell composite module and a bridge type module respectively.

In FIG. 21 (*a*) and FIG. 21 (*b*), the Scott-Russell composite module includes a Scott-Russell upper connecting block, a Scott-Russell lower connecting block and Scott-Russell mechanisms, and the two Scott-Russell mechanisms are symmetrically connected to the two sides of the Scott-Russell upper connecting block, and the two ends of the Scott-Russell lower connecting block are connected with the lower ends of the two Scott-Russell mechanisms respectively.

In FIG. 21 (*a*) and FIG. 21 (*b*), the Scott-Russell includes a Scott-Russell part I and a Scott-Russell part II; the two ends of the Scott-Russell part I and the two ends of the Scott-Russell part II are compliant hinges, and the compliant hinges are horizontally and vertically arranged; one end of the Scott-Russell part II is connected to the middle position of the Scott-Russell part I, and the other end of the Scott-Russell part II is connected with a Scott-Russell lower connecting block; the two ends of the Scott-Russell part I are respectively connected with a Scott-Russell upper connecting block and a total input section; and the connecting lines of the three ends of the Scott-Russell mechanism form a right triangle.

In FIG. 21 (*a*) and FIG. 21 (*b*), the bridge type module includes a branch connecting block and bridge type branches, and one bridge type branch is distributed on each side of the branch connecting block. The bridge type branches are concentrated flexibility type branches; the two ends of the concentrated flexibility type branch are compliant hinges with notches formed in the two sides, and the compliant hinges are horizontally and vertically arranged.

When the forward motion module is a Scott-Russell composite module, a Scott-Russell upper connecting block of the forward motion module is fixed; and when the reverse motion module is a bridge type module, the branch connecting block of the reverse motion module is a total output section.

The anticlockwise direction is taken as a positive direction, and $\theta_1$ is recorded as an angle from a horizontal line to a bridge type branch in the bridge type module; when the Scott-Russell composite module is used as a forward motion module, $\theta_2'$ is recorded as an angle from a horizontal line to a connecting line of the two ends of the Scott-Russell part I, and $\theta_1$ and $\theta_2'$ are in a range of 0-90 degrees or 90-180 degrees at the same time. $\theta_1$ and $\theta_2'$ of FIG. 8 (*a*) in FIG. 21 (*a*) and FIG. 21 (*b*) are in the range of 90-180 degrees at the same time, and $\theta_1$ and $\theta_2'$ of FIG. 8 (*b*) are in the range of 0-90 degrees at the same time.

FIG. 22 shows an example that the forward motion module and the reverse motion module are both a Scott-Russell composite module.

In FIG. 22, a Scott-Russell composite module includes a Scott-Russell upper connecting block, a Scott-Russell lower connecting block and Scott-Russell mechanisms, and the two Scott-Russell mechanisms are symmetrically connected to the two sides of the Scott-Russell upper connecting block. The two ends of the Scott-Russell lower connecting block are connected with the lower ends of the two Scott-Russell mechanisms respectively.

In FIG. 22, the Scott-Russell includes a Scott-Russell part I and a Scott-Russell part II, and the two ends of the Scott-Russell part I and the two ends of the Scott-Russell part II are compliant hinges, and the compliant hinges are horizontally and vertically arranged; one end of the Scott-Russell part II is connected to the middle position of the Scott-Russell part I, and the other end of the Scott-Russell part II is connected with a Scott-Russell lower connecting block; the two ends of the Scott-Russell part I are respectively connected with a Scott-Russell upper connecting block and a total input section; and the connecting lines of the three ends of the Scott-Russell mechanism form a right triangle.

When the forward motion module is a Scott-Russell composite module, a Scott-Russell upper connecting block of the forward motion module is fixed; and when the reverse motion module is a Scott-Russell composite module, a Scott-Russell upper connecting block of the reverse motion module is a total output section.

When the anticlockwise direction is taken as the positive direction and the Scott-Russell composite module is used as a reverse motion module, $\theta_2$ is recorded as an angle from a horizontal line to a connecting line of the two ends of a Scott-Russell part I; when the Scott-Russell composite module is used as a forward motion module, $\theta_2'$ is recorded as an angle from a horizontal line to a connecting line of the two ends of the Scott-Russell part I, and $\theta_2$ and $\theta_2'$ are in a range of 90-180 degrees at the same time.

It should be noted that:

the concept of the Scott-Russell composite module is embodied in FIG. 15. The reverse motion module 2B adopts a Scott-Russell module. The Scott-Russell module includes a Scott-Russell part II (see a figure mark 9B in FIG. 15) and a Scott-Russell lower connecting block 11B which are additionally arranged, so that the symmetry of a reverse motion module 2B is enhanced, and the guiding performance of a total output section 4B is better;

in the embodiment shown in FIG. 21 (b), the forward motion module 1B and the reverse motion module 2B are a Scott-Russell module and a bridge module respectively, and the forward motion module 1B and the reverse motion module 2B are arranged opposite to the forward motion module 1B and the reverse motion module 2B in the embodiment shown in FIG. 14. According to the two embodiments, the position of the total output section 4B can be changed by directly changing the fixed structure, so that the two sides of the invention have the output function, and the application requirements of special scenes are met. In addition, if both the forward motion module 1B and the reverse motion module 2B adopt Scott-Russell modules, the mass distribution of the displacement reducer is more uniform, and the situation that part of the hinges bear too large torque in the horizontal suspension state is avoided;

from FIG. 14 to FIG. 22, except for FIG. 17, the displacement reducer with the input and the output in different directions has the characteristic of symmetry.

Compared with a traditional displacement amplifier, the precision is improved by at least one order of magnitude, for example, the precision is improved to 2 nanometers or even higher; the differential compliant displacement reducer can be matched with a macro-motion platform, and large-range and ultrahigh-precision motion positioning is achieved.

In conclusion, through the three technical solutions, three kinds of displacement reducers with different specific forms are provided, and the displacement reducers have the following common characteristics:

firstly, the three technical solutions all relate to an outer frame and belong to differential displacement reducers which extend upwards and downwards along the two ends of a driver and are formed in the circumferential direction, and the working principles are similar;

secondly, the differential motion of the three technical solutions comes from the difference caused by deformation of deformable parts above and below or obliquely above and below a driver in the displacement reducer;

thirdly, compared with a traditional displacement amplifier, the three technical solutions belong to displacement reducers, the structure is simpler than that of the existing displacement amplifier, the body structure can be integrally machined, the structure is simple, and assembly is not needed; and fourthly, the three technical solutions can be matched with a macro-motion platform, so that large-range and ultrahigh-precision motion positioning is realized; compared with the prior art, the precision can be improved by at least one order of magnitude, for example, the precision is improved to 2 nanometers or even higher.

It can be understood that for those skilled in the art, various displacement reducers disclosed by the embodiments of the invention can be integrally made of plates exemplarily and can also be disassembled into a plurality of parts which are respectively machined and then assembled, and the displacement reducers are not limited to any material or forming mode; a linear driver can be exemplarily selected as the driver, such as a PZT piezoelectric ceramic driver. Only schematic diagrams are shown in all the drawings and do not represent that the size proportion, the relative position, the shape and the like of all the components in various displacement reducers are completely limited by the drawings, for example, the outer frame is not limited to a certain polygonal frame.

Although the preferred embodiments of the invention are described in combination with the attached drawings, the invention is not limited to the specific implementation modes, the specific implementation modes are only schematic and not restrictive, and those of ordinary skill in the art, under the enlightenment of the invention, can also make many forms without departing from the scope protected by the purpose and claims of the invention, and all the forms belong to the protection scope of the invention.

The invention claimed is:

1. A differential compliant displacement reducer, comprising:

two compliant branch chain modules, two rigid connecting blocks correspondingly connected with the two compliant branch chain modules, a fixing block, an output block and a driver arranged between the two rigid connecting blocks;

each compliant branch chain module comprises a corresponding outer compliant branch chain module and a corresponding inner compliant branch chain module, wherein, one end of the outer compliant branch chain module and one end of the inner compliant branch chain module are respectively connected to one end of the rigid connecting block;

the other end of the outer compliant branch chain module is connected to the fixed block;

the other end of the inner compliant branch chain module is connected to the output block; and the fixing block and the output block jointly form an outer frame, all the outer compliant branch chain modules, all the inner compliant branch chain modules, all the rigid connecting blocks and the driver are sealed in the outer frame to form a compact overall structure, and in addition, from the outside to the inside of the outer frame, the outer side of the outer compliant branch chain module, the inner side of the outer compliant branch chain module, the outer side of the inner compliant branch chain module and the inner side of the inner compliant branch chain module are sequentially arranged.

2. The differential compliant displacement reducer according to claim 1, wherein, the outer compliant branch chain module and the inner compliant branch chain module have the same deformation motion direction.

3. The differential compliant displacement reducer according to claim 1, wherein,
the driver provides linear input to enable the two rigid connecting blocks to move away from or close to each other.

4. The differential compliant displacement reducer according to claim 1, wherein,
the outer compliant branch chain module comprises one or more parallel branch chains, the inner compliant branch chain module comprises one or more parallel branch chains, and the outer compliant branch chain module and the inner compliant branch chain module are concentrated flexibility type branch chain modules or distributed flexibility type branch chain modules.

5. The differential compliant displacement reducer according to claim 4, wherein,
the concentrated flexibility type branch chain module is a rigid block with compliant hinges at the two ends; and
the distributed flexibility type branch chain module is a whole section of compliant beam.

6. The differential compliant displacement reducer according to claim 1, wherein,
the outer compliant branch chain module and the inner compliant branch chain module are arranged in the same direction.

7. The differential compliant displacement reducer according to claim 1, wherein the fixed block is of a -shaped half-frame structure, and the output block is located in a gap of the half-frame structure.

8. The differential compliant displacement reducer according to claim 4, wherein,
notches are symmetrically formed in the two sides of the two ends of each concentrated flexibility type branch chain module, and compliant hinges are formed on the inner sides of the notches.

9. A differential compliant displacement reducer, comprising:
two fixed half-bridge compliant modules, two movable half-bridge compliant modules, two rigid connecting blocks, a middle block, an output block and a driver between the two rigid connecting blocks;
along the circumferential direction of the displacement reducer, a movable outer frame is formed by the first fixed half-bridge compliant module, the first rigid connecting block, the first movable half-bridge compliant module, the output block, the second movable half-bridge compliant module, the second rigid connecting block, the second fixed half-bridge compliant module and the middle block;
for the fixed half-bridge compliant module and the movable half-bridge compliant module which are connected with the rigid connecting block, wherein,
one end of the fixed half-bridge compliant module and one end of the movable half-bridge compliant module are connected to the two ends of the rigid connecting block respectively;
the other end of the fixed half-bridge compliant module is connected to the middle block; and the other end of the movable half-bridge compliant module is connected to the output block.

10. The differential compliant displacement reducer according to claim 9, wherein,
a compliant branch chain is a concentrated flexibility type branch chain or a distributed flexibility type branch chain.

11. The differential compliant displacement reducer according to claim 9, wherein,
notches are symmetrically formed in the two sides of the two ends of each concentrated flexibility type branch chain, and compliant hinges are formed on the inner sides of the notches.

12. The differential compliant displacement reducer according to claim 11, wherein,
the distributed flexibility type branch chain is a whole section of compliant beam, and the compliant beam is a long beam or a reed.

13. The differential compliant displacement reducer according to claim 9, wherein,
the fixed half-bridge compliant module and the movable half-bridge compliant module are arranged in the same direction.

14. The differential compliant displacement reducer according to claim 9, wherein,
a middle block of the fixed half-bridge compliant module is connected with a rack, and a middle block of the movable half-bridge compliant module is an output end.

15. The differential compliant displacement reducer according to claim 9, wherein,
the two ends of the driver are fixedly connected with the two rigid connecting blocks, and the driver provides linear input to enable the two rigid connecting blocks to move away from or close to each other.

16. A differential compliant displacement reducer, comprising:
a forward motion module, a reverse motion module, two total input sections, a total output section and a driver;
one end of the forward motion module is connected with one end of the first total input section, and the other end of the forward motion module is connected with one end of the second total input section;
one end of the reverse motion module is connected with the other end of the first total input section, and the other end of the reverse motion module is connected with the other end of the second total input section;
the driver is arranged between the first total input section and the second total input section; and
the driver simultaneously provides displacement input for the forward motion module and the reverse motion module.

17. The differential compliant displacement reducer according to claim 16, wherein,
the forward motion module and the reverse motion module are combined in a manner that a bridge type module is combined with a Scott-Russell composite module, the Scott-Russell composite module is combined with the bridge type module, or the Scott-Russell composite module is combined with the Scott-Russell composite module.

18. The differential compliant displacement reducer according to claim 17, wherein,
the bridge type module comprises a branch connecting block and bridge type branches, and one or more bridge type branches are distributed and connected to the two sides of the branch connecting block.

19. The differential compliant displacement reducer according to claim 17, wherein,
the bridge type branch is a concentrated flexibility type branch or a distributed flexibility type branch;

notches are symmetrically formed in the two sides of the two ends of the concentrated flexibility type branch, and compliant hinges are formed on the inner sides of the notches; and the distributed flexibility type branch is a whole section of compliant beam, and the compliant beam is a long beam or a reed.

20. The differential compliant displacement reducer according to claim 17, wherein, when the forward motion module is a Scott-Russell composite module, a Scott-Russell upper connecting block of the forward motion module is fixed; when the forward motion module is a bridge type module, the branch connecting block of the forward motion module is fixed; and when the reverse motion module is a Scott-Russell composite module, a Scott-Russell upper connecting block of the reverse motion module is a total output section; and when the reverse motion module is a bridge type module, the branch connecting block of the reverse motion module is a total output section.

\* \* \* \* \*